US010097316B2

(12) United States Patent
Damnjanovic et al.

(10) Patent No.: US 10,097,316 B2
(45) Date of Patent: Oct. 9, 2018

(54) HARQ HANDLING AT INTER-BEAM HANDOVER

(71) Applicant: QUALCOMM Incorporated, San Diego, CA (US)

(72) Inventors: Jelena Damnjanovic, Del Mar, CA (US); Gene Wesley Marsh, Encinitas, CA (US); Mario Maro Scipione, Del Mar, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 15/165,890

(22) Filed: May 26, 2016

(65) Prior Publication Data

US 2017/0099120 A1 Apr. 6, 2017

Related U.S. Application Data

(60) Provisional application No. 62/237,521, filed on Oct. 5, 2015.

(51) Int. Cl.
*H04W 4/00* (2018.01)
*H04L 1/18* (2006.01)
*H04L 5/00* (2006.01)
*H04W 72/04* (2009.01)
*H04B 7/185* (2006.01)
*H04B 7/204* (2006.01)

(52) U.S. Cl.
CPC ....... *H04L 1/1822* (2013.01); *H04B 7/18541* (2013.01); *H04B 7/2041* (2013.01); *H04L 5/0055* (2013.01); *H04W 72/046* (2013.01)

(58) Field of Classification Search
None
See application file for complete search history.

(56) References Cited

U.S. PATENT DOCUMENTS

| 6,298,073 | B1 * | 10/2001 | LeFever | ............... | H04B 7/2125 370/503 |
| 7,185,257 | B2 | 2/2007 | Kim et al. | | |
| 8,245,088 | B1 | 8/2012 | Srinivas et al. | | |
| 9,059,845 | B2 | 6/2015 | Dalsgaard et al. | | |
| 2008/0168321 | A1 | 7/2008 | Lim et al. | | |

(Continued)

FOREIGN PATENT DOCUMENTS

| EP | 0808034 A2 | 11/1997 |
| WO | WO-2014163361 A1 | 10/2014 |

OTHER PUBLICATIONS

International Search Report and Written Opinion—PCT/US2016/053809—ISA/EPO—Dec. 15, 2016.

*Primary Examiner* — Phirin Sam
(74) *Attorney, Agent, or Firm* — Paradice and Li LLP

(57) ABSTRACT

A method and apparatus for operating a controller for a satellite communications system during inter-beam handovers. In some aspects, the controller may perform an inter-beam handover by switching communications with a user terminal from a first beam to a second beam of a satellite. The controller receives a feedback message form the user terminal, via the first beam, after the inter-beam handover is completed, and may then selectively retransmit data to the user terminal via the second beam based at least in part on the feedback message.

50 Claims, 19 Drawing Sheets

(56) References Cited

U.S. PATENT DOCUMENTS

| | | |
|---|---|---|
| 2012/0057539 A1 | 3/2012 | Kuo |
| 2014/0126512 A1 | 5/2014 | Kim et al. |
| 2015/0024677 A1* | 1/2015 | Gopal .................. H04B 7/2041 455/13.1 |
| 2015/0256297 A1* | 9/2015 | Yang ..................... H04L 1/1896 370/216 |
| 2015/0271730 A1* | 9/2015 | Benammar ........... H04W 36/30 455/436 |
| 2016/0094481 A1* | 3/2016 | Xu ....................... H04B 7/1853 370/230 |
| 2017/0041850 A1* | 2/2017 | Benammar ........... H04W 36/30 |
| 2017/0078978 A1* | 3/2017 | Scipione ............... H04W 52/18 |
| 2017/0374596 A1* | 12/2017 | Benammar ........... H04W 36/30 |

* cited by examiner

HARQ HANDLING AT INTER-BEAM HANDOVER

CROSS-REFERENCE TO RELATED APPLICATIONS

This application claims priority under 35 USC 119(e) to commonly owned U.S. Provisional Patent Application No. 62/237,521 entitled "HARQ HANDLING AT INTER-BEAM HANDOVER" filed on Oct. 5, 2015, the entirety of which is incorporated by reference herein.

INTRODUCTION

Various aspects described herein relate to satellite communications, and more particularly to improving the throughput of satellite communications during inter-beam handovers.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

Compared to GSO satellite-based and terrestrial communication systems, non-geosynchronous satellite-based systems, such as LEO satellite-based systems, may present several challenges. For example, because LEO satellites move quickly across the sky relative to a given point on the earth's surface, beams transmitted from an LEO satellite may pass relatively quickly across a user terminal (UT). The process by which the UT transitions from a first beam to a second beam of the satellite may be referred to as "inter-beam handover." Due to propagation delays, signals received by the satellite via the first beam (e.g., prior to the inter-beam handover) may not be received by a network controller (NAC) for the satellite until after the inter-beam handover is completed (e.g., when communications between the UT and the satellite have switched over to the second beam). Each beam is typically managed by a respective media access controller (MAC) and/or scheduler within the NAC. As a result, a scheduler for the first beam is typically unaware of any communications received by a scheduler for the second beam after the inter-beam handover has been completed.

Hybrid automatic repeat request (HARQ) is a method by which a receiving device may request retransmission of data that was received in error. More specifically, HARQ allows for buffering and combining of incorrectly received data (e.g., packets, frames, PDUs, MPDUs, etc.) to potentially reduce the number of retransmissions needed to properly reconstruct a particular unit of data. However, if the UT initiates a HARQ process on the first beam of a satellite (e.g., before the inter-beam handover), the scheduler for the second beam may be unaware of, and thus unable to complete, the HARQ process after the inter-beam handover. As a result, any ongoing HARQ processes (e.g., including buffers storing incorrectly received data) may be reset during an inter-beam handover. This may cause an increase in the number of retransmissions, which may reduce the overall throughput of communications in the satellite communications system.

SUMMARY

Aspects of the disclosure are directed to apparatuses and methods for reducing and/or minimizing retransmissions that may occur as a result of inter-beam handovers in a satellite communications system. In one example, a method of operating a network controller for a satellite communications system is disclosed. The method may include performing an inter-beam handover by switching communications with a user terminal from a first beam to a second beam of a satellite, receiving a feedback message from the user terminal, via the first beam, after the inter-beam handover is completed, and selectively retransmitting data to the user terminal via the second beam based at least in part on the feedback message.

In another example, a network controller for a satellite communications system is disclosed. The network controller may include one or more processors and a memory configured to store instructions. Execution of the instructions by the one or more processors may cause the network controller to perform an inter-beam handover by switching communications with a user terminal from a first beam to a second beam of a satellite, receive a feedback message from the user terminal, via the first beam, after the inter-beam handover is completed, and selectively retransmit data to the user terminal via the second beam based at least in part on the feedback message.

In another example, a network controller for a satellite communications system is disclosed. The network controller may include means for performing an inter-beam handover by switching communications with a user terminal from a first beam to a second beam of a satellite, means for receiving a feedback message from the user terminal, via the first beam, after the inter-beam handover is completed, and means for selectively retransmitting data to the user terminal via the second beam based at least in part on the feedback message.

In another example, a non-transitory computer-readable medium is disclosed. The non-transitory computer-readable medium may store instructions that, when executed by one or more processors of a network controller for a satellite communications system, cause the network controller to perform operations that may include performing an inter-beam handover by switching communications with a user terminal from a first beam to a second beam of a satellite, receiving a feedback message from the user terminal, via the first beam, after the inter-beam handover is completed, and selectively retransmitting data to the user terminal via the second beam based at least in part on the feedback message.

In another example, a method of operating a user terminal in a satellite communications system is disclosed. The method may include transmitting a feedback message to a controller of the satellite communications system, via a first beam of a satellite, to request retransmission of a first set of data previously received by the user terminal, performing an inter-beam handover by switching communications with the controller from the first beam to a second beam of the satellite, and receiving a retransmission of the first set of data via the second beam.

In another example, a user terminal is disclosed. The user terminal may include one or more processors and a memory configured to store instructions. Execution of the instructions by the one or more processors may cause the user terminal to transmit a feedback message to a controller of a satellite communications system, via a first beam of a satellite, to request retransmission of a first set of data previously received by the user terminal, perform an inter-beam handover by switching communications with the controller from the first beam to a second beam of the satellite, and receive a retransmission of the first set of data via the second beam.

In another example, a user terminal is disclosed. The user terminal may include means for transmitting a feedback message to a controller of a satellite communications system, via a first beam of a satellite, to request retransmission of a first set of data previously received by the user terminal, means for performing an inter-beam handover by switching communications with the controller form the first beam to a second beam of the satellite, and means for receiving a retransmission of the first set of data via the second beam.

In another example, a non-transitory computer-readable medium is disclosed. The non-transitory computer-readable medium may store instructions that, when executed by one or more processors of a user terminal, cause the user terminal to perform operations that may include transmitting a feedback message to a controller of a satellite communications system, via a first beam of a satellite, to request retransmission of a first set of data previously received by the user terminal, performing an inter-beam handover by switching communications with the controller from the first beam to a second beam of the satellite, and receiving a retransmission of the first set of data via the second beam.

BRIEF DESCRIPTION OF THE DRAWINGS

Aspects of this disclosure are illustrated by way of example and are not intended to be limited by the figures of the accompanying drawings.

DETAILED DESCRIPTION

Figure 1:
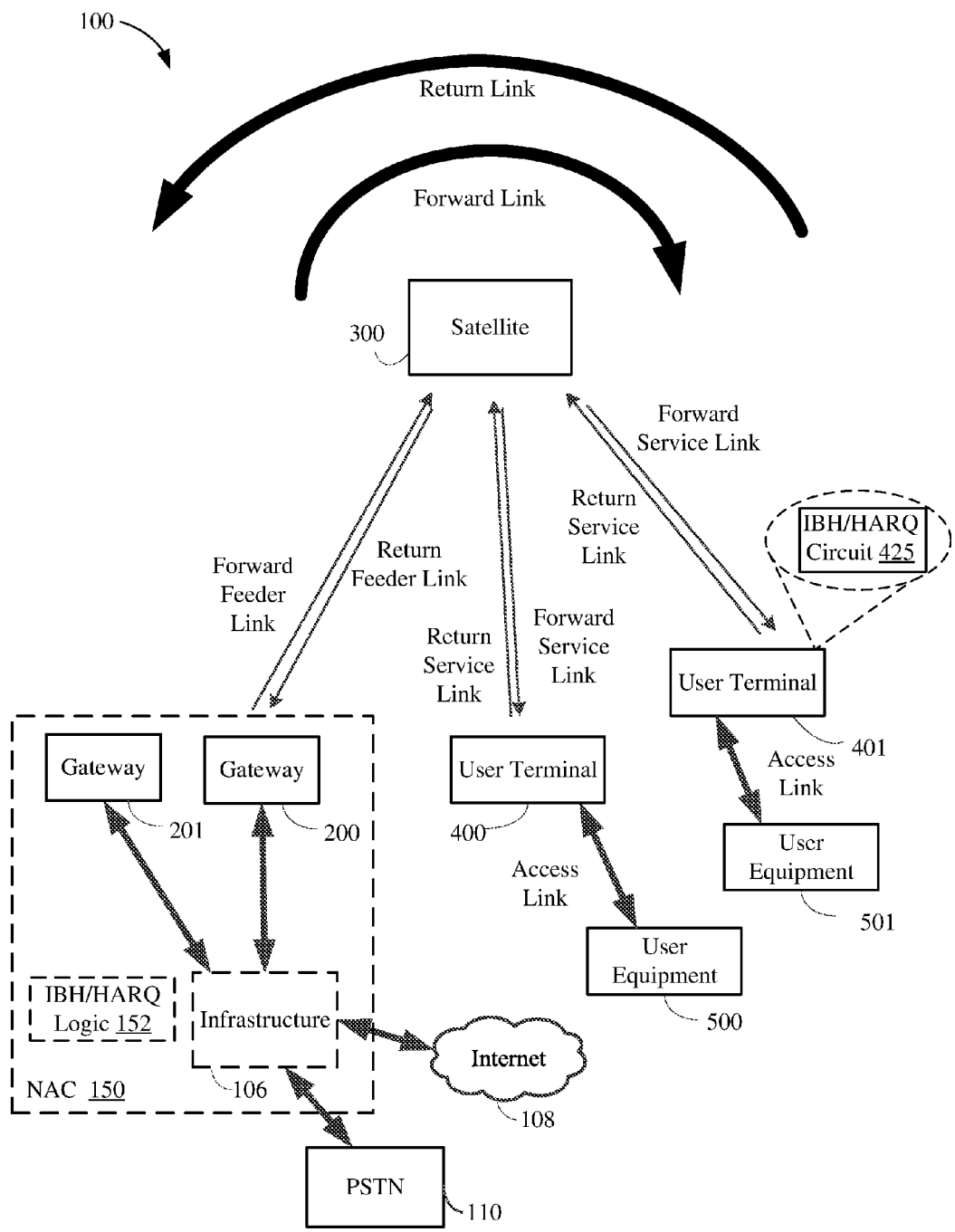
FIG. 1 shows a block diagram of an example communication system.

The example implementations described herein may allow hybrid automatic repeat request (HARQ) processes in a satellite communications system to be preserved across inter-beam handovers, thus increasing the throughput of the system. As described in more detail below, a network controller for a satellite may perform an inter-beam handover by switching communications with a user terminal from a first beam (e.g., source beam) of the satellite to a second beam (e.g., target beam) of the satellite. Due to propagation delays, the network controller may receive a HARQ feedback message from the user terminal via the first beam after communications with the user terminal have already switched over to the second beam. Accordingly, the example implementations may enable the network controller to selectively retransmit data to the user terminal via the second beam based at least in part on the HARQ feedback message received via the first beam.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), network access controller (NAC) 150 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The UT 400 may include an inter-beam handover and hybrid automatic repeat request (IBH/HARQ) circuit 425 that may allow the UT 400 to transmit a feedback message to the NAC 150, via a first beam of a satellite (e.g., satellite 300), to request retransmission of a first set of data previously received by the UT 400. In example implementations, the IBH/HARQ circuit 425 may further enable the UT 400 to perform an inter-beam handover by switching communications with the NAC 150 from the first beam to a second beam of the satellite. Thereafter, the UT 400 may receive a retransmission of the first set of data (e.g., from the NAC 150) via the second beam, for example, as described in more detail below with respect to FIGS. 7-17.

The NAC 150 may include gateways 200 and 201, infrastructure 106, and additional components (not shown for simplicity) for communicating with the satellite 300. The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations, the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

The NAC 150 may include inter-beam handover and hybrid automatic repeat request (IBH/HARQ) logic 152 that may enable the NAC 150 to perform an inter-beam handover by switching communications with a user terminal (e.g., UT 400 and/or UT 401) from a first beam to a second beam of a satellite (e.g., satellite 300). In example implementations, the IBH/HARQ logic 152 may further enable the NAC 150 to receive a feedback message from a particular user terminal, via the first beam, after the inter-beam handover is completed. Thereafter, the NAC 150 may selectively retransmit data to the user terminal via the second beam based at least in part on the feedback message, for example, as described in more detail below with respect to FIGS. 7-17.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
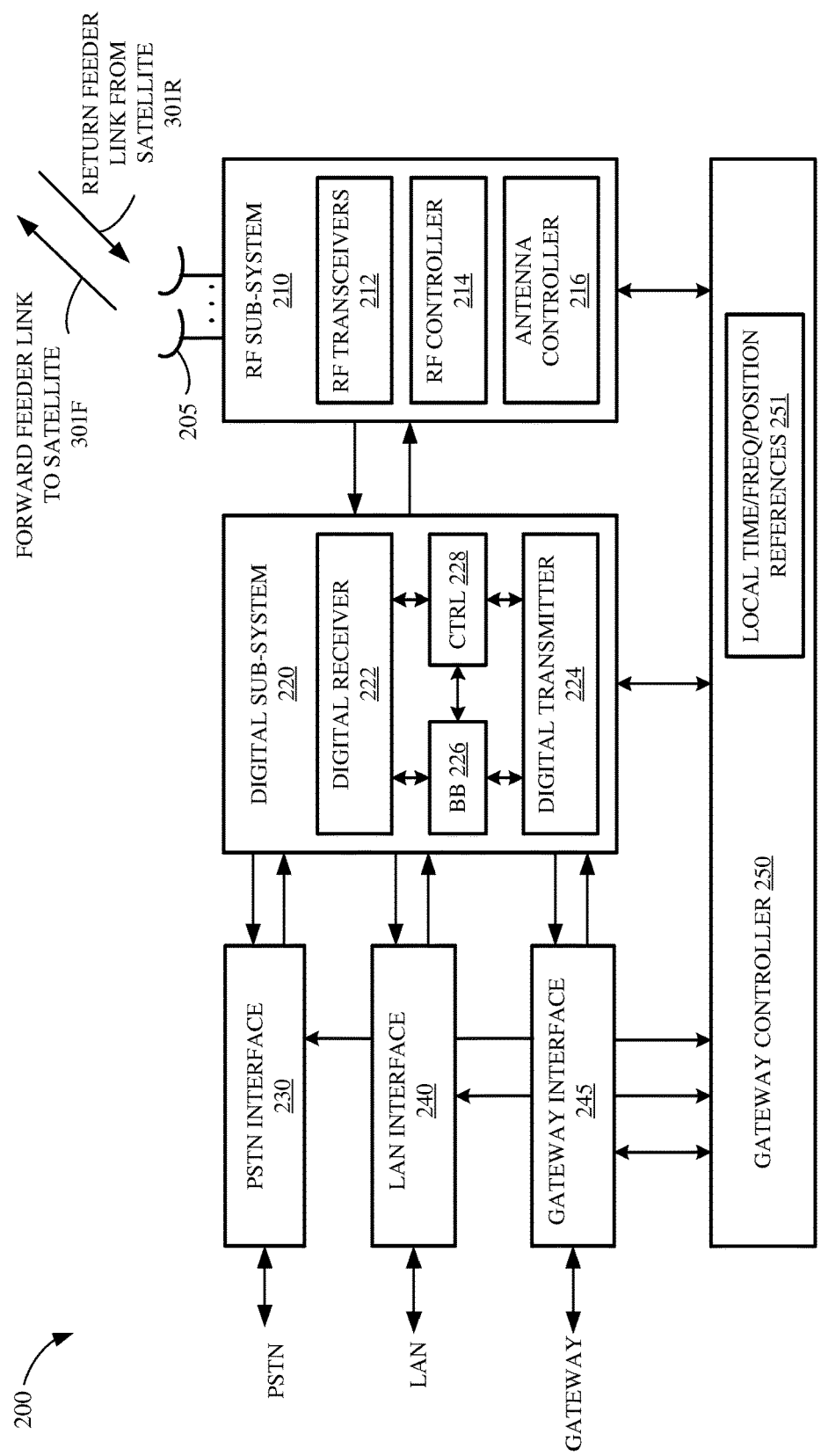
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Figure 3:
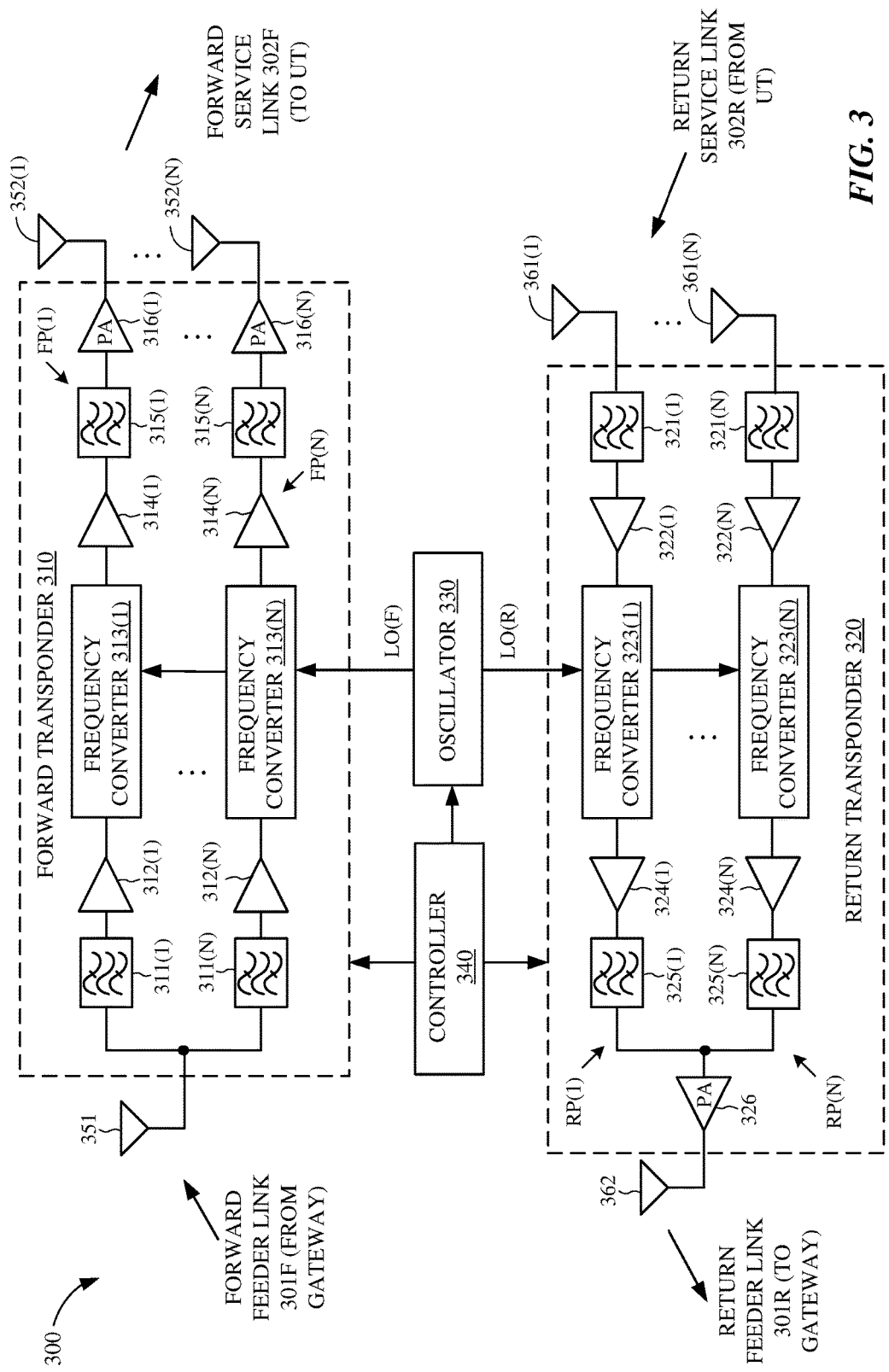
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 12-15.

Figure 4:
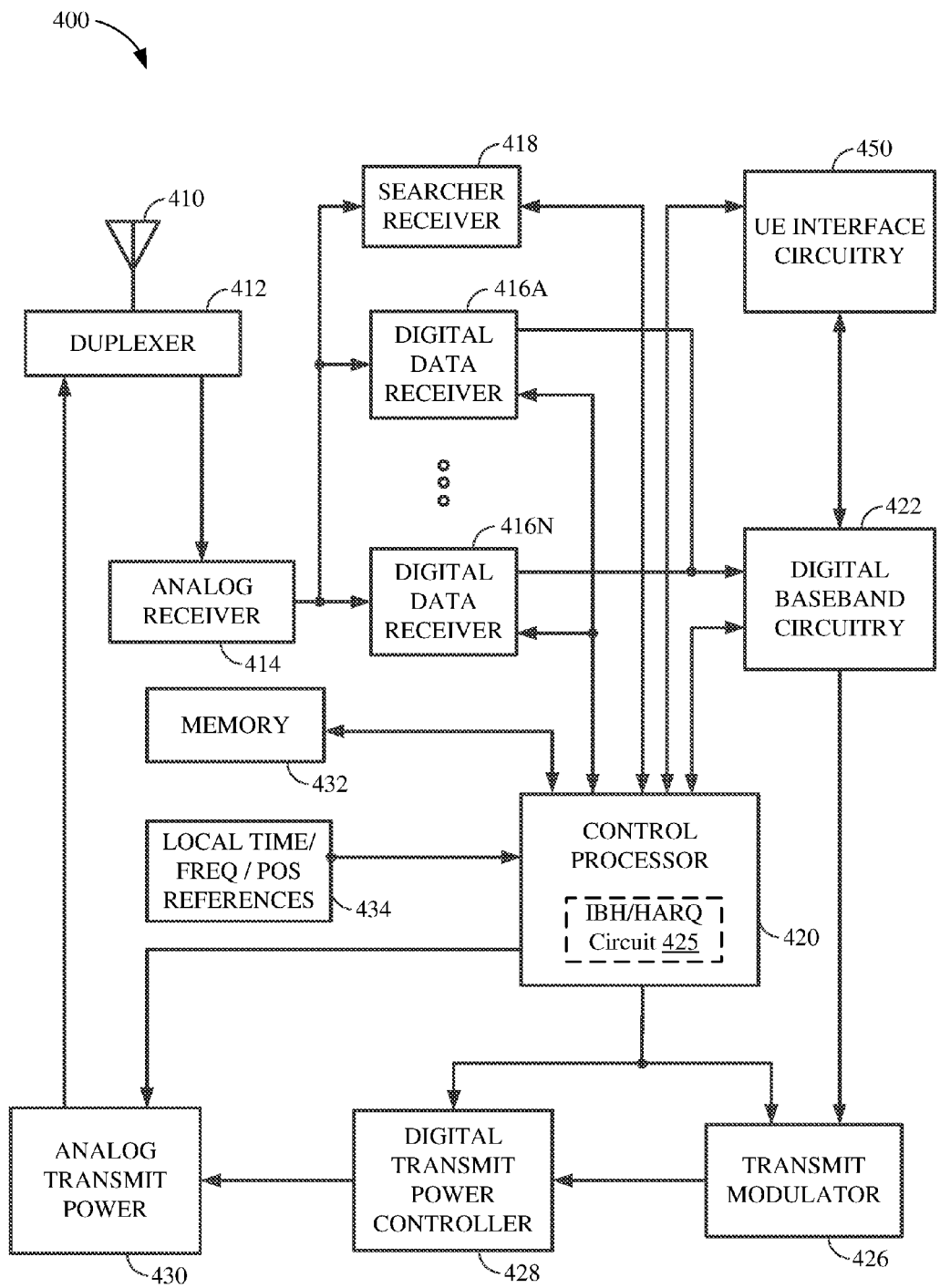
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The UT 400 may include an inter-beam handover and hybrid automatic repeat request (IBH/HARQ) circuit 425 that may allow the UT 400 to transmit a feedback message to a network controller (e.g., NAC 150), via a first beam of a satellite (e.g., satellite 300), to request retransmission of a first set of data previously received by the UT 400. In example implementations, the IBH/HARQ circuit 425 may further enable the UT 400 to perform an inter-beam handover by switching communications with the network controller from the first beam to a second beam of the satellite. Thereafter, the UT 400 may receive a retransmission of the first set of data (e.g., from the network controller) via the second beam, for example, as described in more detail below with respect to FIGS. 7-17.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
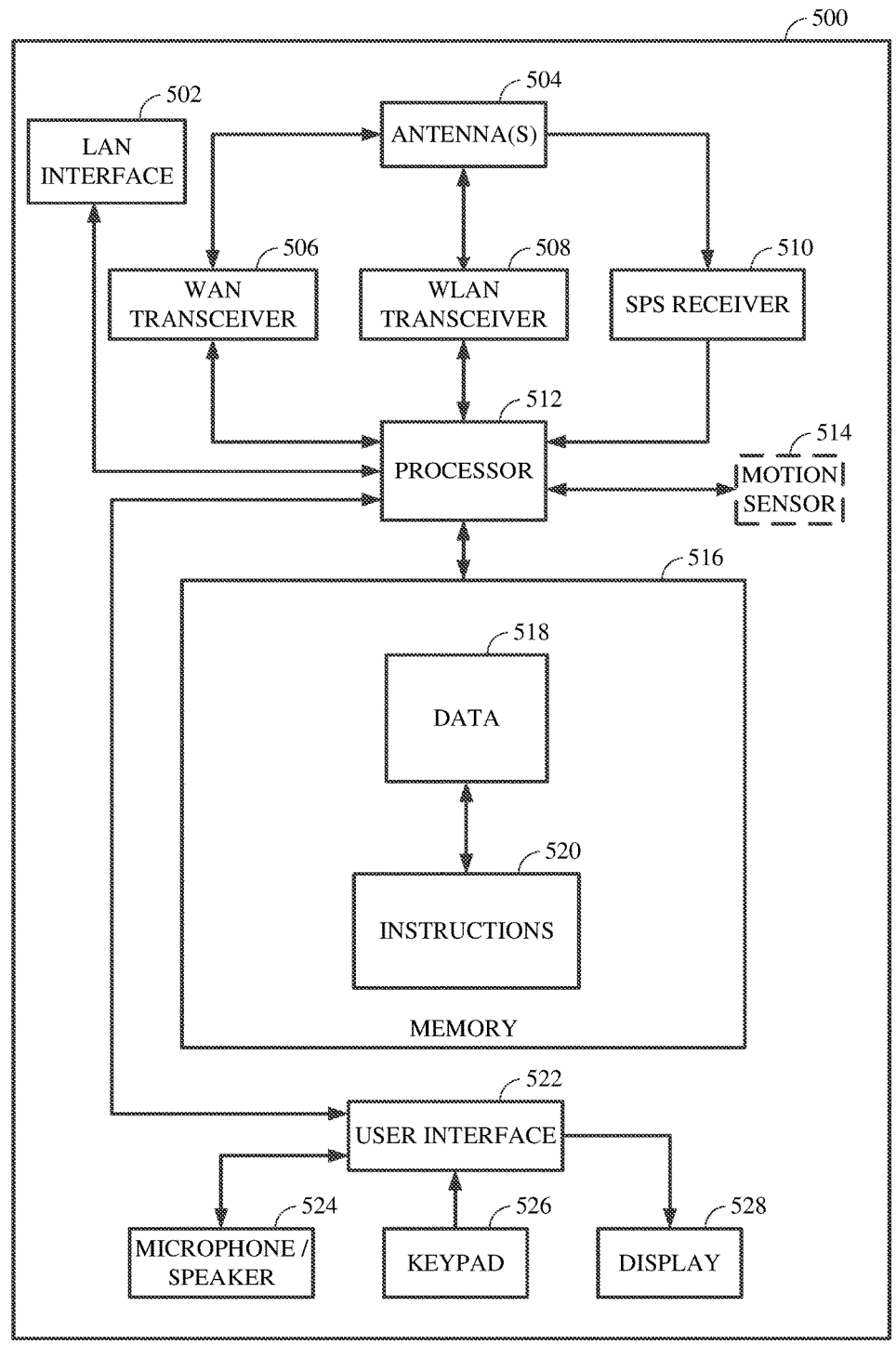
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), GLONASS and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the Earth's surface, and revolve around the Earth in an equatorial orbit at the Earth's own angular velocity. In contrast, NGSO satellites are deployed in non-geostationary orbits and revolve around the Earth above various paths of the Earth's surface at relatively low altitudes (e.g., as compared with GSO satellites).

Figure 6:
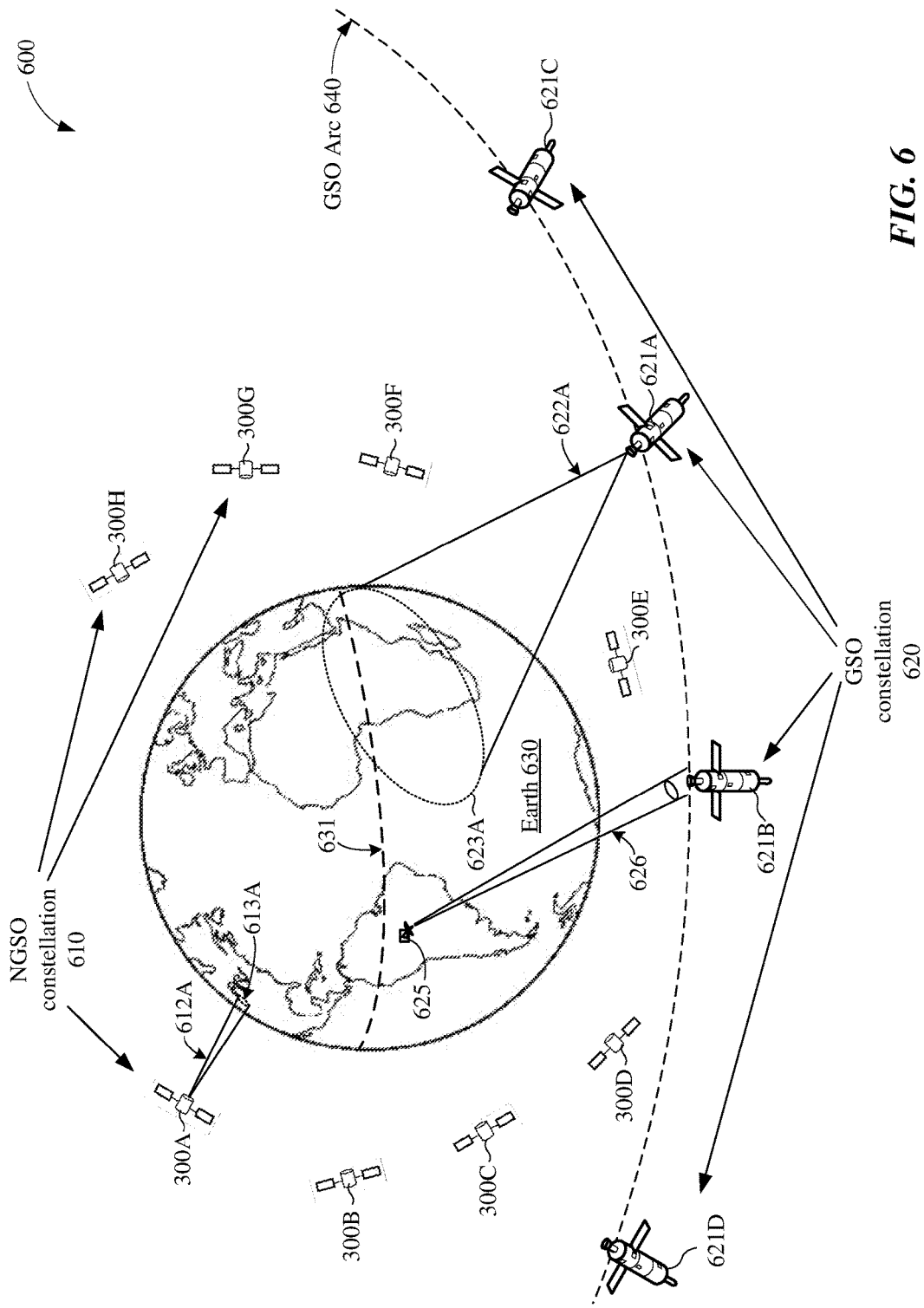
FIG. 6 shows a diagram depicting an NGSO satellite constellation and a GSO satellite constellation orbiting the earth.

For example, FIG. 6 shows a diagram 600 depicting a first constellation 610 of NGSO satellites 300A-300H and a second constellation 620 of GSO satellites 621A-621D in orbit around Earth 630. Although depicted in FIG. 6 as including only eight NGSO satellites 300A-300H, the first constellation 610 may include any suitable number of NGSO satellites, for example, to provide world-wide satellite coverage. For some implementations, the first constellation 610 may include between 600 and 900 NGSO satellites. Similarly, although depicted in FIG. 6 as including only four GSO satellites 621A-621D, the second constellation 620 may include any suitable number of GSO satellites, for example, to provide world-wide satellite coverage. In addition, although not shown in FIG. 6 for simplicity, one or more other constellations of GSO satellites and/or one or more other constellations of NGSO satellites may be in orbit above Earth 630.

The first constellation 610, which may hereinafter be referred to as the NGSO satellite constellation 610, may provide a first satellite service to most, if not all, areas on Earth 630. The second constellation 620, which may hereinafter be referred to as the GSO satellite constellation 620, may provide a second satellite service to large portions of Earth 630. The first satellite service may be different than the second satellite service. For some aspects, the first satellite service provided by the NGSO satellite constellation 610 may correspond to a global broadband Internet service, and the second satellite service provided by the GSO satellite constellation 620 may correspond to a satellite-based broadcast (e.g., television) service. Further, for at least some implementations, each of NGSO satellites 300A-300H may be one example of satellite 300 of FIGS. 1 and 3.

The NGSO satellites 300A-300H may orbit the Earth 630 in any suitable number of non-geosynchronous orbital planes (not shown for simplicity), and each of the orbital planes may include a plurality of NGSO satellites (e.g., such as one or more of the NGSO satellites 300A-300H). The non-geosynchronous orbital planes may include, for example, polar orbital patterns and/or Walker orbital patterns. Thus, to a stationary observer on Earth 630, the NGSO satellites 300A-300H appear to move quickly across the sky in a plurality of different paths across the Earth's surface, with each of the NGSO satellites 300A-300H providing coverage for a corresponding path across the earth's surface.

In contrast, the GSO satellites 621A-621D may be in a geosynchronous orbit around Earth 630 and thus, to a stationary observer on Earth 630, may appear motionless in a fixed position in the sky located above the Earth's equator 631. Each of the GSO satellites 621A-621D maintains a relatively fixed line-of-sight with a corresponding GSO ground station on Earth 630. For example, GSO satellite 621B is depicted in FIG. 6 as maintaining a relatively fixed line-of-sight with a GSO ground station 625. It is noted that for a given point on the surface of Earth 630, there may be an arc of positions in the sky along which the GSO satellites 621A-621D may be located. This arc of GSO satellite positions may be referred to herein as the GSO arc 640. The receiving area for a GSO ground station (e.g., such as GSO ground station 625) may be defined by an antenna pattern of typically fixed orientation and fixed beam width (such as a beam width defined by an ITU specification). For example, the GSO ground station 625 is depicted as transmitting a beam 626 towards GSO satellite 621B.

In some aspects, each of the NGSO satellites 300A-300H may include a number of directional antennas to provide high-speed forward links (e.g., downlinks) with user terminals such as UT 400 of FIG. 1 and/or with gateways such as gateway 200 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A is relatively small compared to the coverage area 623A provided by a beam 622A transmitted from GSO satellite 621A.

Because the NGSO satellites 300A-300H revolve around the earth 630 relatively quickly (e.g., approximately every 90 minutes for low-earth-orbit (LEO) satellites), their positions change quickly relative to a fixed location on earth 630. To provide coverage over a wide area of the earth's surface (e.g., to provide Internet services across the United States), each of the NGSO satellites 300A-300H may provide coverage for a corresponding path across the earth's surface. For example, the NGSO satellites 300A-300H may each transmit any number of beams, and one or more of the beams may be directed towards overlapping regions on the earth's surface. As used herein, the footprint of a satellite is the surface area (on Earth) within which all UTs can communicate with the satellite (above a minimum elevation angle). The area covered by a beam transmitted (e.g., from a corresponding antenna) of the satellite is referred to herein as the beam coverage area. Thus, the footprint of a satellite may be defined by a number of beam coverage areas provided by a number of beams transmitted from the satellite.

Figure 7:
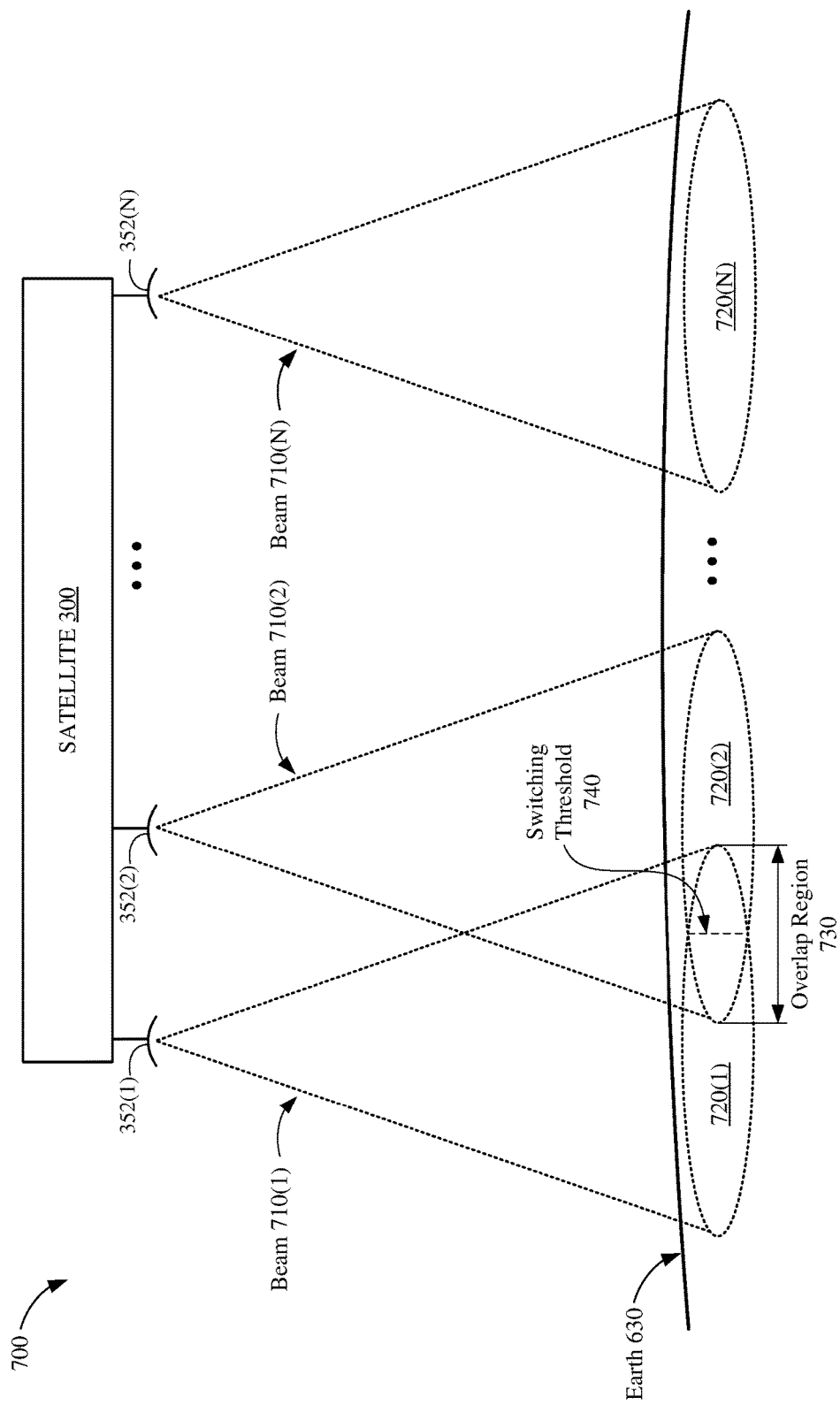
FIG. 7 depicts an NGSO satellite transmitting a number of beams onto the surface of the Earth.

FIG. 7 shows a diagram 700 depicting satellite 300 transmitting a number (N) of beams 710(1)-710(N) from a respective number (N) of antennas 352(1)-352(N). Referring also to FIG. 3, each of the antennas 352(1)-352(N) may be coupled to a corresponding forward path (FP) in the forward transponder 310 of satellite 300. Each of the beams 710(1)-710(N) may be used to transmit data from satellite 300 to one or more user terminals (e.g., UT 400 of FIG. 4) that are located within the beam's coverage area on Earth. Thus, in some aspects, the beams 710(1)-710(N) may represent the forward service link between satellite 300 and a number of UTs 400. For the example diagram 700 of FIG. 7, the beams 710(1)-710(N) are depicted as providing coverage areas 720(1)-720(N), respectively, on Earth 630. Together, the coverage areas 720(1)-720(N) provided by respective beams 710(1)-710(N) may define the footprint of satellite 300.

Each of the coverage areas 720(1)-720(N) may extend across an entire width of the satellite's footprint. In some implementations, the coverage areas 720(1)-720(N) may be of other suitable shapes, sizes, and/or orientations. Further, for at least some implementations, all satellites 300 in the NGSO satellite constellation 610 may have substantially similar footprints. Each of the beams 710(1)-710(N) operates as a respective communications channel of the satellite 300. As the satellite 300 passes over a user terminal on the surface of the earth 630, the channel quality of a given beam (e.g., as measured by the user terminal) may deteriorate, whereas the channel quality of a different beam may improve. Thus, it may be necessary to periodically switch the communications channel for the user terminal from one beam to another. This process may be referred to herein as "inter-beam handover."

Adjacent pairs of the coverage areas 720(1)-720(N) may touch and/or overlap each other, for example, so that the footprint provided by the beams 710(1)-710(N) may have minimal coverage gaps. In the example of FIG. 7, the intersection of beams 710(1) and 710(2) form an overlap region 730. Based on the movements of the satellite 300, a user terminal lying exclusively within coverage area 720(1) (e.g., and outside the overlap region 730) at a first time may eventually fall within the overlap region 730 at a second time. When the user terminal is within the overlap region 730, it may be able to communicate with satellite 300 using beam 710(1) or beam 710(2). At a certain point in the satellite's orbit, the channel quality of beam 710(2) will exceed the channel quality of beam 710(1), thus prompting an inter-beam handover from the current beam 710(1) (e.g., the "source beam") to the new beam 710(2) (e.g., the "target beam"). For example, the inter-beam handover may be triggered when the user terminal crosses a switching threshold 740 (e.g., such that the user terminal is subsequently more prominently positioned within the coverage area 720 (2) of the target beam 710(2) than the coverage area 720(1) of the source beam 710(1)).

The satellite 300 may be controlled by a network controller (e.g., NAC 150 of FIG. 1) on the surface of the earth 630. More specifically, each beam 710(1)-710(N) may be managed and/or controlled by a respective scheduler within, or otherwise associated with, the network controller. During an inter-beam handover, the scheduler for the source beam hands off communications with the user terminal to the scheduler for the target beam. The network controller and the user terminal may perform this operation synchronously, for example, based on a timeline specified in a beam transition table. However, due to propagation delays, some signals transmitted by the user terminal on the source beam (e.g., prior to inter-beam handover) may be received by the network controller after the inter-beam handover is completed (e.g., when communications between the user terminal and the satellite 300 have already switched over to the target beam). This may pose significant challenges in maintaining hybrid automatic repeat request (HARQ) processes across inter-beam handovers, as the scheduler for the target beam is typically unaware of any HARQ processes being performed by the source beam's scheduler.

HARQ is a process by which a receiving device may request retransmission of data that was received in error. More specifically, HARQ allows for buffering and combining of incorrectly received data (e.g., packets, frames, PDUs, MPDUs, etc.) to potentially reduce the number of retransmissions needed to properly reconstruct a particular unit of data. For example, if a user terminal receives an incorrect unit of data from a network controller, the user terminal may request retransmission of that particular unit of data. Rather than discard the incorrect unit of data, the user terminal may also store the incorrect unit of data (e.g., in a HARQ buffer) to be combined with the retransmitted data, for example, to more quickly recover the correct unit of data. For example, if both the original unit of data and the retransmitted data have errors, the user terminal may combine the error-free portions to reconstruct the correct unit of data. This process may be repeated, as necessary, for any number of retransmissions (e.g., until the correct unit of data is recovered).

However, if the user terminal initiates a HARQ process on the source beam that is not completed before the inter-beam handover, the scheduler for the target beam may be unable to complete the HARQ process. For example, the target beam's scheduler is typically unaware of the retransmission request received by the source beam's scheduler. Furthermore, the target beam's scheduler typically does not have access to the data and/or other information associated with the HARQ processes associated with the source beam's scheduler. As a result, any ongoing HARQ processes (e.g., including buffers storing incorrectly received data) may be reset during inter-beam handovers. This may cause an increase in the number of retransmissions that are performed after an inter-beam handover, which may reduce the overall throughput of communications in the satellite communications system.

In some aspects, the network controller for the satellite 300 may maintain any ongoing HARQ processes during the inter-beam handover. For example, as described in greater detail below, the scheduler for the source beam may communicate HARQ information to the scheduler for the target beam after performing an inter-beam handover (e.g., including HARQ information received on the source beam after the inter-beam handover is completed), thus allowing the target beam's scheduler to continue and/or complete (e.g., on the target beam) any ongoing HARQ processes that were initiated on the source beam. In some implementations, some or all of the HARQ processes may be performed by satellite 300. Thus, although the operations for maintaining ongoing HARQ processes are described herein with respect to the network controller, in other aspects, at least a portion of such operations may be performed by satellite 300 (e.g., in lieu of, or in combination with, the network controller).

Figure 8A:
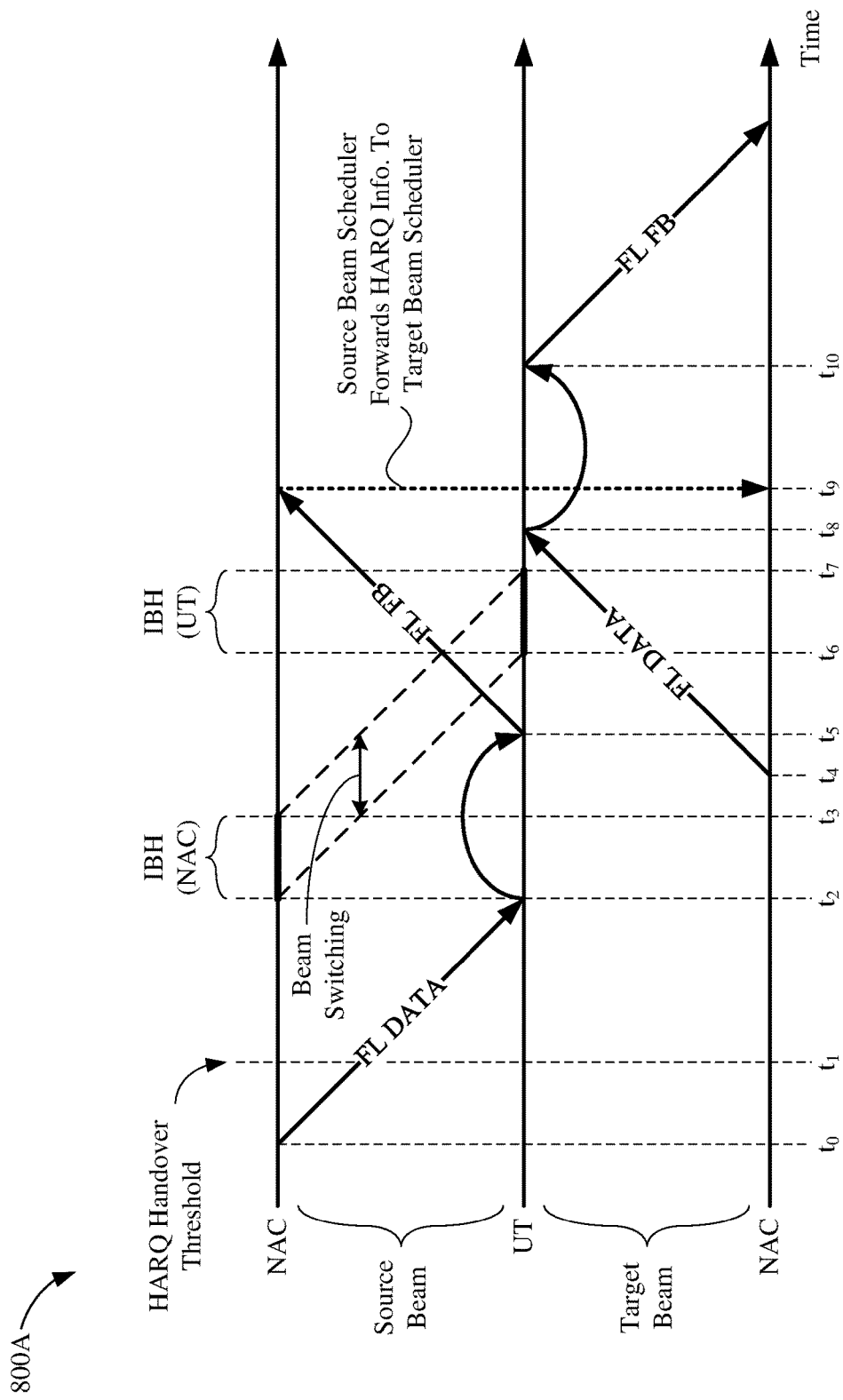
FIG. 8A shows an example timing diagram depicting an operation for maintaining an automatic repeat request (HARQ) process during inter-beam handover.

FIG. 8A shows an example timing diagram 800A depicting an operation for maintaining a hybrid automatic repeat request (HARQ) process during inter-beam handover. For purposes of discussion herein, the network controller (NAC) may correspond to NAC 150 of FIG. 1, and the user terminal (UT) may correspond to UT 400 of FIG. 4. Furthermore, with reference to FIG. 7, the source beam and target beam may correspond to beams 710(1) and 710(2), respectively, of satellite 300. More specifically, the source beam and target beam may be controlled by respective schedulers (not shown for simplicity) within the NAC.

The UT initially operates on the source beam (e.g., at time $t_0$). For example, at this time, the UT may reside exclusively within the coverage area 720(1) of the beam 710(1). At time $t_0$, the NAC transmits a set of forward-link (FL) data to the UT via the source beam (e.g., on the forward link). Due to propagation delays in the satellite communications system, the UT receives the FL data some time later (e.g., at time $t_2$). The UT then checks the received FL data (e.g., based on cyclic redundancy check (CRC) and/or forward error correction (FEC) information), from times $t_2$ to $t_5$, to determine whether the FL data is received correctly (e.g., and to fix any correctable errors in the received FL data). Then, at time $t_5$, the UT returns an FL feedback (FB) message to the NAC, via the source beam, based on a result of the determination. For example, if all of the FL data is received correctly, the UT may send an acknowledgement (ACK) with the FL feedback message confirming receipt of the FL data. However, if portions of the received FL data are incorrect, and/or cannot be corrected through FEC, the UT may send a negative acknowledgment (NACK) with the FL feedback message requesting retransmission of the FL data (e.g., or one or more portions thereof).

Meanwhile, from times $t_2$ to $t_3$, the NAC may perform an inter-beam handover (IBH) to hand off communications with the UT from the source beam to the target beam. For example, at time $t_2$, the UT may have crossed the switching threshold 740, at which point the channel quality of beam 710(2) may be superior to the channel quality of beam 710(1) (e.g., as perceived by the UT). The UT also performs the inter-beam handover, in conjunction with the NAC. However, due to the long communication distances between the NAC and the UT (e.g., and associated propagation delays), the UT performs the inter-beam handover from times $t_6$ to $t_7$ (e.g., which corresponds with the inter-beam handover by the NAC from times $t_2$ to $t_3$). For example, in this manner, if the NAC were to transmit a forward link communication to the UT just before initiating its inter-beam handover (e.g., at time $t_2$), the UT will receive the forward link communication just before initiating its inter-beam handover (e.g., at time $t_6$).

While the inter-beam handover is being performed (e.g., from times $t_2$ to $t_3$ on the NAC and from times $t_6$ to $t_7$ on the UT), no data may be communicated between the NAC and the UT. This time period may be referred to herein as a "beam switching interval," and is denoted by the dashed lines connecting the respective IBH boundaries for the NAC and the UT. In the example of FIG. 8A, the UT transmits the FL feedback message on the source beam prior to the beam switching interval. However, due to propagation delays, the FL feedback message does not arrive at the NAC (e.g., via the source beam) until after the inter-beam handover has been completed, at time $t_9$. For example, with reference to FIG. 7, any reverse-link communications received by the satellite 300 may be forwarded or relayed to the NAC, regardless of the coverage area 720(1)-720(N) in which the UT resides when initiating such communications.

By the time the NAC receives the FL feedback message (e.g., at time $t_9$), communications with the UT have already switched over to the target beam. Thus, in some aspects, the NAC and/or scheduler associated with the source beam may communicate the FL feedback message, and any related HARQ information needed to preserve the HARQ process that was initiated on the source beam prior to the inter-beam handover, to the scheduler associated with the target beam. For example, the HARQ information passed on to the target beam's scheduler may include: the feedback message (e.g., indicating an ACK or a NACK), HARQ process IDs, pointers to buffers storing data associated with any ongoing HARQ processes (e.g., that have not yet been completed by the source beam's scheduler), and/or payload information associated with the pointers. In some implementations, the source beam's scheduler may also communicate the number of retransmissions already attempted on the source beam for each HARQ process. As described in greater detail below, the target beam's scheduler may use the HARQ information received from the source beam's scheduler to take over the ongoing HARQ processes.

After the inter-beam handover is completed on the NAC, at time $t_4$, the NAC may resume transmissions of FL data to the UT via the target beam. As described above, due to propagation delays, the FL data transmitted by the NAC immediately after the inter-beam handover performed by the NAC (e.g., at time $t_4$) arrives at the UT immediately after the inter-beam handover performed by the UT (e.g., at time $t_8$). The UT again checks the received FL data, from times $t_8$ to $t_{10}$, to determine whether the FL data is received correctly (e.g., and to fix any correctable errors in the received FL data). Then, at time $t_{10}$, the UT returns another FL feedback message (e.g., ACK or NACK) to the NAC, via the target beam, based on a result of the determination.

In some aspects, the NAC may suspend forward-link transmissions on the source beam at least a threshold duration prior to performing the inter-beam handover. For example, with reference to FIG. 8A, the threshold may occur at time $t_1$ and may be referred to herein as a "HARQ handover threshold." More specifically, due to processing times needed for the UT to process the FL data (e.g., from times $t_2$ to $t_5$) and/or other delays, any forward link communications initiated after the HARQ handover threshold (e.g., after time $t_1$) is unlikely to be processed by the UT before the inter-beam handover (e.g., from times $t_6$ to $t_7$). In other words, if the NAC were to transmit FL data (e.g., to the UT) on the source beam after time $t_1$, the UT may be unable to return an FL feedback message for the received FL data (e.g., to the NAC) because it may no longer be operating on the source beam. Thus, in some aspects, the NAC may suspend FL data transmissions to the UT (e.g., on the source beam) once the HARQ handover threshold has been reached (e.g., at time $t_1$), and may subsequently resume FL data transmissions (e.g., on the target beam) after the inter-beam handover is completed (e.g., at time $t_3$).

Figure 8B:
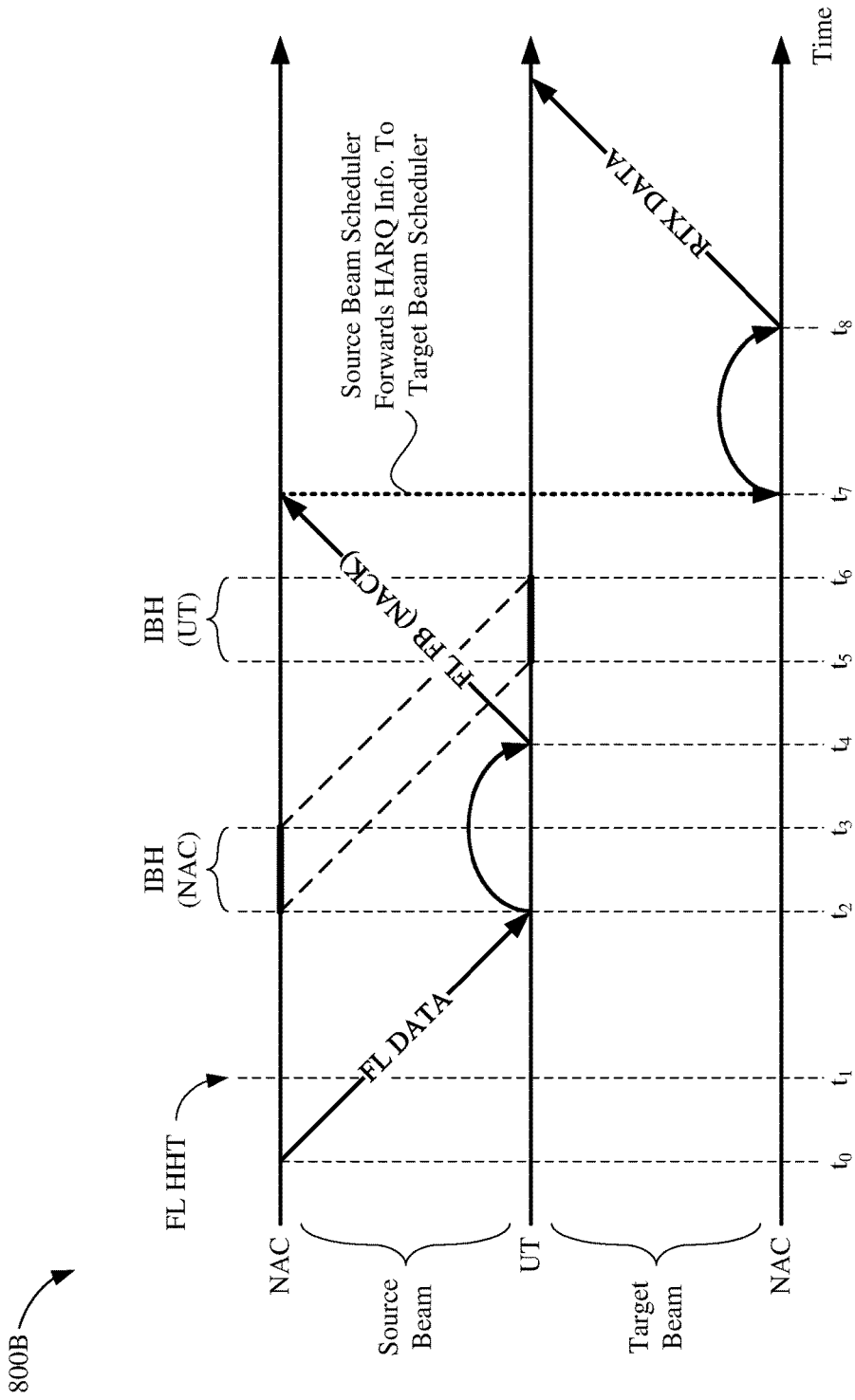
FIG. 8B shows an example timing diagram depicting an operation for completing, on a target beam, a forward-link HARQ process initiated on a source beam prior to inter-beam handover.

FIG. 8B shows an example timing diagram 800B depicting an operation for completing, on a target beam, a forward-link HARQ process initiated on a source beam prior to inter-beam handover. As described above with respect to FIG. 8A, the NAC may correspond to NAC 150 of FIG. 1, and the UT may correspond to UT 400 of FIG. 4. Furthermore, the source beam and target beam may be controlled by respective schedulers (not shown for simplicity) within the NAC.

The UT initially operates on the source beam (e.g., at time $t_0$). At time $t_0$, the NAC transmits a set of FL data to the UT via the source beam (e.g., on the forward link). In some aspects, the NAC may suspend forward-link transmissions to the UT once the forward-link HARQ handover threshold (FL HHT) is reached, at time $t_1$. The UT receives the FL data at time $t_2$ (e.g., due to propagation delays), and inspects the FL data (from times $t_2$ to $t_4$) to determine whether any portions of the data were received in error (e.g., based on CRC and/or FEC information). In some implementations, the UT may also attempt to correct any errors in the received FL data during this time (e.g., from times $t_2$ to $t_4$). In the example of FIG. 8B, the UT may determine that at least some of the received FL data contains uncorrectable errors. Thus, at time $t_4$, the UT returns an FL feedback message on the source beam containing a negative-acknowledgement (NACK) of the received FL data.

Meanwhile, from times $t_2$ to $t_3$, the NAC performs an inter-beam handover to hand off communications with the UT from the source beam to the target beam. The UT also performs the inter-beam handover, in conjunction with the NAC, from times $t_5$ to $t_6$. Thus, with reference to FIG. 8B, the UT transmits the FL feedback message on the source beam prior to the beam switching interval (e.g., denoted by the dashed lines connecting the respective IBH boundaries for the NAC and the UT). However, due to propagation delays, the FL feedback message does not arrive at the NAC (e.g., via the source beam) until after the inter-beam handover has been completed, at time $t_7$. Thus, by the time the NAC receives the FL message (e.g., at time $t_7$), communications with the UT have already switched over to the target beam.

In some aspects, the NAC and/or scheduler associated with the source beam may communicate the FL feedback message, and any related HARQ information needed to preserve the HARQ process that was initiated on the source beam prior to the inter-beam handover, to the scheduler associated with the target beam. More specifically, because the FL feedback message includes a NACK, the target beam's scheduler may need to retransmit at least a portion of the FL data that was previously transmitted (e.g., to the UT) on the source beam. Thus, the information passed on to the target beam's scheduler may include: the feedback message (e.g., indicating the NACK), HARQ process IDs, pointers to buffers storing the data that needs to be retransmitted, and/or payload information associated with the pointers. In some implementations, the source beam's scheduler may also communicate the number of retransmissions already attempted on the source beam for data to be retransmitted.

Furthermore, the UT may preserve any ongoing HARQ processes during its inter-beam handover (e.g., from times $t_5$ to $t_6$). For example, rather than reset its HARQ buffers, the UT may continue to maintain and/or preserve any previously received FL data that has not been properly recovered. Thus, when the target beam's scheduler takes over the ongoing HARQ process from the source beam's scheduler, at time $t_7$, the HARQ process on the UT may continue seamlessly after the inter-beam handover has been completed. For example, the target beam's scheduler may determine (e.g., and retrieve) the data that needs to be retransmitted to the UT, from times $t_7$ to $t_8$, and send a corresponding retransmission (RTX) to the UT, at time $t_8$, on the target beam. The UT may then proceed to reconstruct the corresponding FL data based on the newly received RTX data and any stored FL data containing errors (e.g., received prior to the inter-beam handover).

Figure 9A:
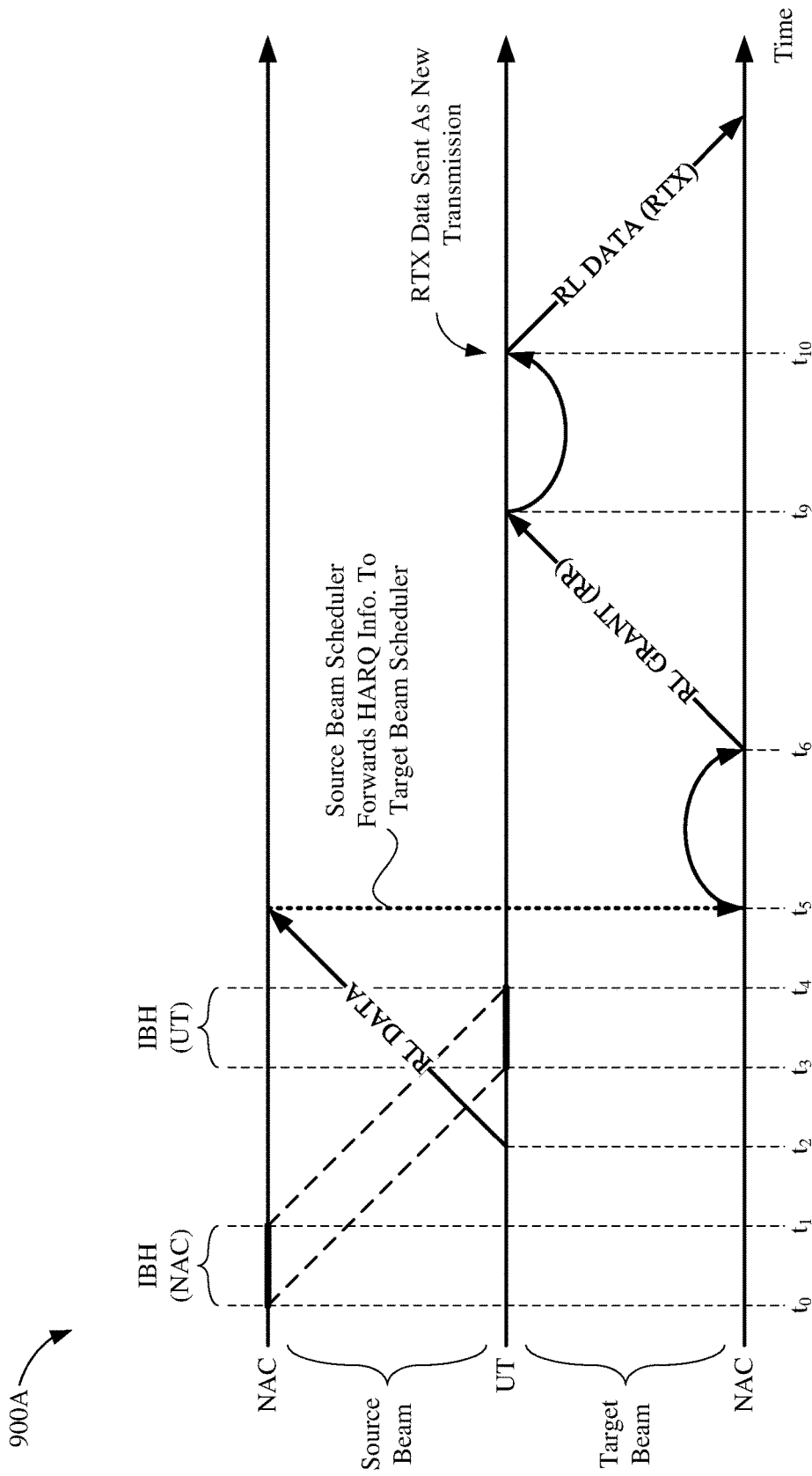
FIG. 9A shows an example timing diagram depicting an operation for completing, on a target beam, a reverse-link HARQ process initiated on a source beam prior to inter-beam handover.

FIG. 9A shows an example timing diagram 900A depicting an operation for completing, on a target beam, a reverse-link HARQ process initiated on a source beam prior to inter-beam handover. For purposes of discussion herein, the network controller (NAC) may correspond to NAC 150 of FIG. 1, and the user terminal (UT) may correspond to UT 400 of FIG. 4. Furthermore, the source beam and target beam may be controlled by respective schedulers (not shown for simplicity) within the NAC.

The UT initially operates on the source beam (e.g., at time $t_0$). The NAC performs an inter-beam handover (IBH), from times $t_0$ to $t_1$, to hand off communications with the UT from the source beam to the target beam. At time $t_2$, the UT transmits a set of reverse-link (RL) data to the NAC via the source beam (e.g., on the reverse link). Then, from times $t_3$ to $t_4$, the UT also performs the inter-beam handover (e.g., in conjunction with the NAC). Thus, while the UT transmits the RL data on the source beam prior to the beam switching interval (e.g., denoted by the dashed lines connecting the respective IBH boundaries for the NAC and the UT), due to propagation delays, the RL data does not arrive at the NAC (e.g., on the source beam) until after the inter-beam handover has been completed, at time $t_5$. Thus, by the time the NAC receives the RL data (e.g., at time $t_5$), communications with the UT have already switched over to the target beam. The NAC is therefore unable to respond to the received RL data (e.g., with an RL feedback message) via the source beam.

In some aspects, the NAC and/or scheduler associated with the source beam may communicate the received RL data, and any related HARQ information needed to preserve ongoing HARQ processes initiated prior to the inter-beam handover, to the scheduler associated with the target beam. For example, the information passed on to the target beam's scheduler may include: the RL data (e.g., received just before the inter-beam handover) and/or pointers to ongoing HARQ processes (e.g., corresponding to data that may need to be retransmitted). Thus, the target beam's scheduler may inspect the RL data (e.g., received from the source beam's scheduler) for errors, from times $t_5$ to $t_6$, and may send an RL grant message to the UT, at time $t_6$, based on a result of the inspection. The RL grant message may allow the UT to transmit reverse-link communications on the target beam and, in some aspects, may instruct the UT to retransmit RL data received in error (e.g., prior to the inter-beam handover).

In some aspects, the NAC and/or scheduler associated with the target beam may use a reverse-link (RL) feedback message to instruct the UT to retransmit RL data received in error. For example, the target beam's scheduler may generate an RL feedback message based on the RL data received from the source beam's scheduler (e.g., prior to the inter-beam handover). Accordingly, the RL feedback message may indicate whether the RL data was received correctly (e.g., ACK) or with errors (e.g., NACK).

Upon receiving a retransmission request (e.g., via the RL grant message or an RL feedback message), the UT may proceed to retransmit the requested data via the target beam. For example, during the inter-beam handover, the UT may preserve any pointers to buffers storing data associated with ongoing HARQ processes initiated prior to the handover (e.g., including any RL data that may need to be retransmitted). In some aspects, the NAC may combine the retransmitted RL data with any stored RL data containing errors (e.g., received prior to the inter-beam handover).

In some implementations, it may be difficult to combine portions of received RL data (e.g., containing errors) across the schedulers for the different beams. For example, due to the complexity of the NAC, any RL data that was not correctly received by the source beam's scheduler (e.g., prior to the inter-beam handover) may not be combined with retransmitted RL data subsequently received on the target beam (e.g., after the inter-beam handover). However, there may be only a limited number of retransmission attempts allowed for each HARQ process. Thus, in order to prevent any retransmissions attempted on the source beam from reducing the number of subsequent retransmissions that may be allowed on the target beam, the NAC may request that any data to be retransmitted for an ongoing HARQ process is sent as a new data transmission (e.g., rather than a retransmission attempt for the particular HARQ process).

In the example of FIG. 9A, the NAC may determine that at least some of the received RL data contains uncorrectable errors. Thus, at time $t_6$, the NAC returns an RL grant message on the target beam containing a retransmission request (RR) for the received RL data. Furthermore, in some aspects, the NAC may request that the data to be retransmitted (e.g., corresponding to the RL data originally transmitted on the source beam at time $t_2$) is sent as a new data transmission. The UT receives the RL grant message at time $t_9$ and determines (e.g., and retrieves) the data that needs to be retransmitted to the NAC (e.g., from times $t_9$ to $t_{10}$). The UT then retransmits the corresponding RL data to the NAC, at time $t_{10}$, as a new data transmission. In this manner, the ongoing HARQ process on the source beam is preserved (e.g., through the inter-beam handover) without a diminished number of retransmission attempts on the target beam.

Figure 9B:
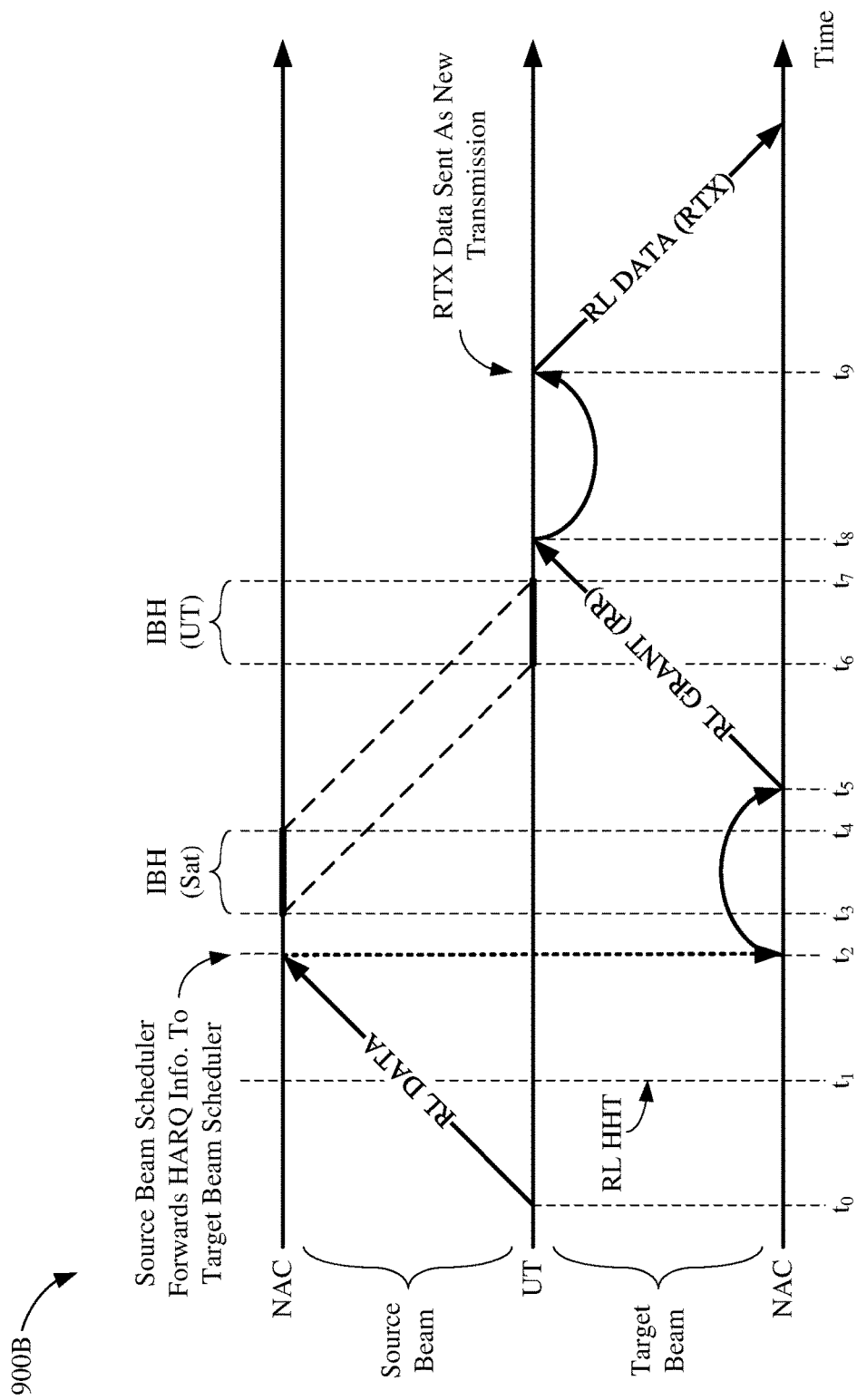
FIG. 9B shows an example timing diagram depicting an operation for completing, on a target beam, a reverse-link HARQ process initiated on a source beam prior to inter-beam handover.

FIG. 9B shows an example timing diagram 900B depicting an operation for completing, on a target beam, a reverse-link HARQ process initiated on a source beam prior to inter-beam handover. As described above, with respect to FIG. 9A, the NAC may correspond to NAC 150 of FIG. 1, and the UT may correspond to UT 400 of FIG. 4. Furthermore, the source beam and target beam may be controlled by respective schedulers (not shown for simplicity) within the NAC.

The UT initially operates on the source beam (e.g., at time $t_0$). At time $t_0$, the UT transmits a set of RL data to the NAC via the source beam (e.g., on the reverse link). Due to propagation delays, the NAC receives the RL data at time $t_1$. However, the NAC is scheduled to perform an inter-beam handover from times $t_2$ to $t_3$, and may therefore be unable to process the RL data (e.g., and respond with a feedback message) before communications with the UT are handed over to the target beam. For example, as indicated in FIG. 9B, time $t_2$ may correspond with a reverse-link HARQ handover threshold (RL HHT). More specifically, due to processing times needed for the NAC to process the RL data and/or other delays, any reverse link communications initiated past the reverse-link HARQ handover threshold (e.g., after time $t_1$) will not be processed by the NAC prior to the inter-beam handover (e.g., from times $t_2$ to $t_3$).

Thus, in some aspects, if the NAC receives RL data on the source beam after the reverse-link HARQ handover threshold is reached, the NAC and/or scheduler associated with the source beam may communicate the RL data, and any related HARQ information needed to preserve ongoing HARQ processes initiated prior to the inter-beam handover, to the scheduler associated with the target beam. For example, the information passed on to the target beam's scheduler may include: the RL data (e.g., received just before the inter-beam handover) and/or pointers to ongoing HARQ processes (e.g., corresponding to data that may need to be retransmitted). Furthermore, during the inter-beam handover, the UT may preserve any pointers to buffers storing data associated with ongoing HARQ processes initiated prior to the handover (e.g., including any RL data that may need to be retransmitted).

Accordingly, the target beam's scheduler may inspect the RL data (e.g., received from the source beam's scheduler) for errors, from times $t_1$ to $t_4$, and may send an RL grant message (and/or RL feedback message) to the UT, at time $t_4$, based on a result of the inspection. In the example of FIG. 9B, the NAC may determine that at least some of the received RL data contains uncorrectable errors. Thus, at time $t_4$, the NAC returns an RL grant message on the target beam containing a retransmission request (RR) for the received RL data. As described above, the NAC may be unable to combine portions of received RL data (e.g., containing errors) across schedulers for different beams. Thus, in some aspects, the NAC may request that the data to be retransmitted (e.g., corresponding to the RL data originally transmitted on the source beam at time $t_0$) is sent as a new data transmission.

The UT performs a corresponding inter-beam handover from times $t_5$ to $t_6$ and, after switching over to the target beam, receives the RL grant message on the target beam at time $t_7$. The UT then determines (e.g., and retrieves) the data that needs to be retransmitted to the NAC (e.g., from times $t_7$ to $t_8$), and retransmits the corresponding RL data to the NAC, at time $t_8$, as a new data transmission.

Figure 10:
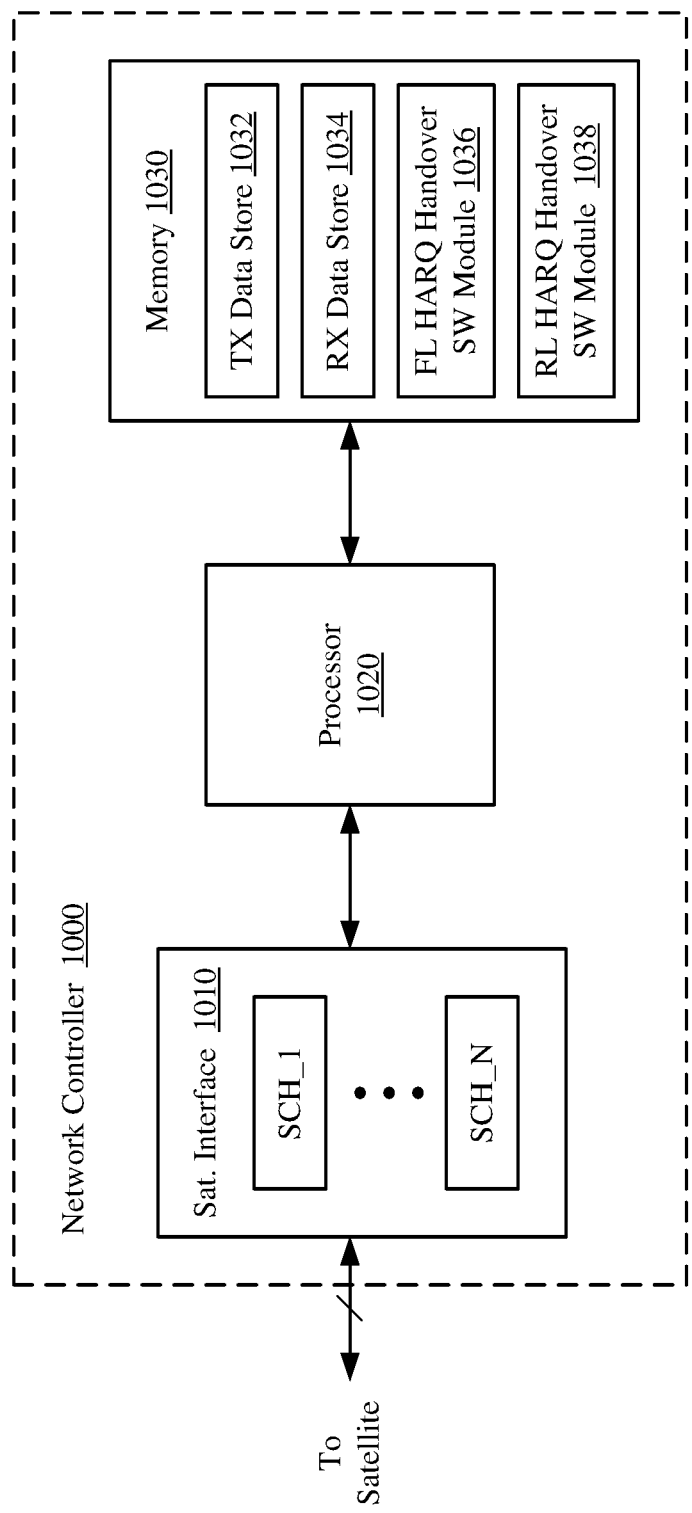
FIG. 10 shows a block diagram of an example network controller in accordance with example implementations.

FIG. 10 is a block diagram of an example network controller 1000 in accordance with example implementations. For purposes of discussion herein, the network controller 1000 may be an example of (or implemented within) the NAC 150 of FIG. 1. The network controller 1000 includes a satellite interface 1010, a processor 1020, and memory 1030. The satellite interface 1010 may be configured to communicate with a particular satellite (e.g., satellite 300 of FIG. 1). Furthermore, the satellite interface 1010 may include a number of schedulers SCH_1-SCH_N that control the communications for respective beams of the satellite (e.g., as described above with respect to FIG. 7). For some implementations, the network controller 1000 may include other circuitry and/or components in addition to those shown in FIG. 10.

Memory 1030 includes a transmit (TX) data store 1032 and a receive (RX) data store 1034. The TX data store 1032 may store outgoing data to be transmitted on a forward link of a particular beam of the satellite. In some implementations, the TX data store 1032 may store FL data associated with ongoing HARQ processes maintained by one or more of the schedulers SCH_1-SCH_N for forward-link communications sent to a user terminal. The RX data store 1034 may store incoming data received on a reverse link of a particular beam of the satellite. In some implementations, the RX data store 1034 may store RL data associated with ongoing HARQ processes maintained by one or more of the schedulers SCH_1-SCH_N for reverse-link communications received from the user terminal.

Figure 12:
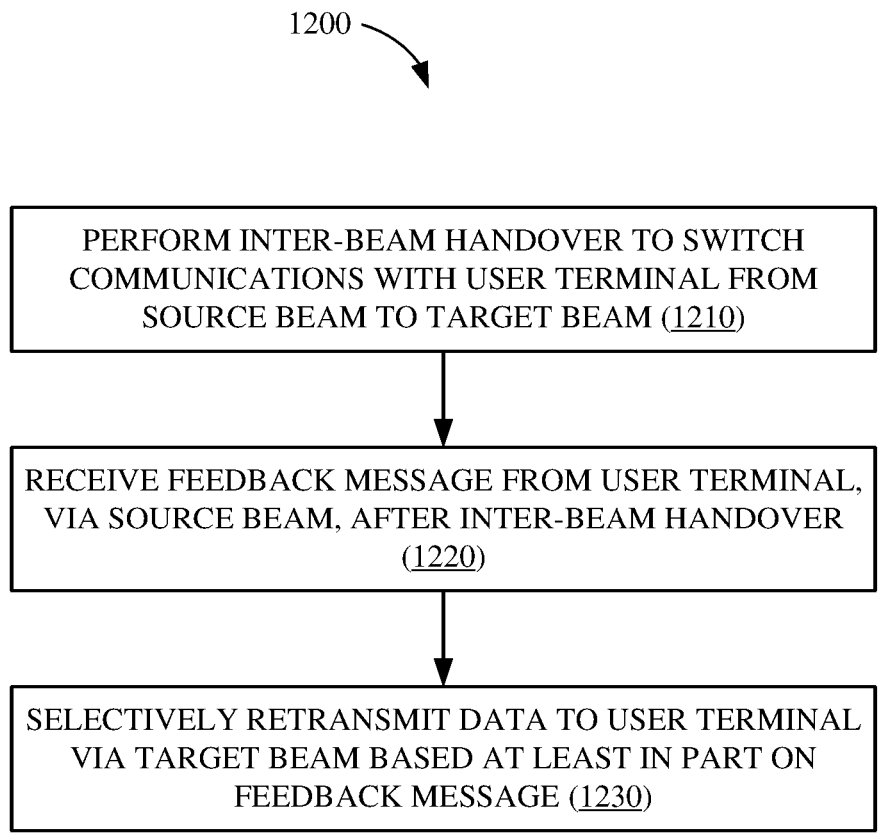
FIG. 12 shows an illustrative flowchart depicting an example operation for maintaining a HARQ process during inter-beam handover.
Figure 13:
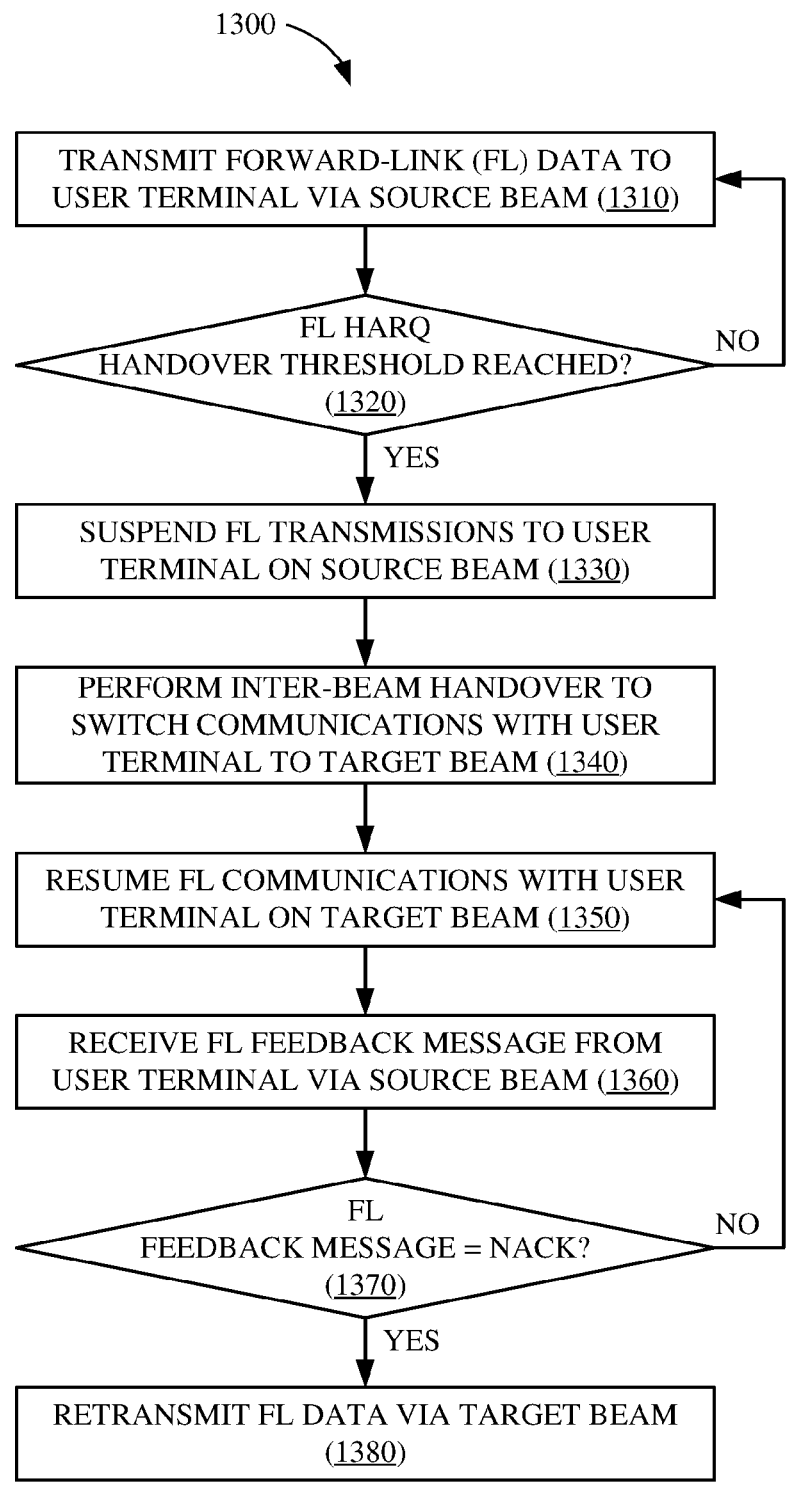
FIG. 13 shows an illustrative flowchart depicting an example operation for selectively retransmitting data on a target beam in response to a feedback message received on a source beam.
Figure 14:
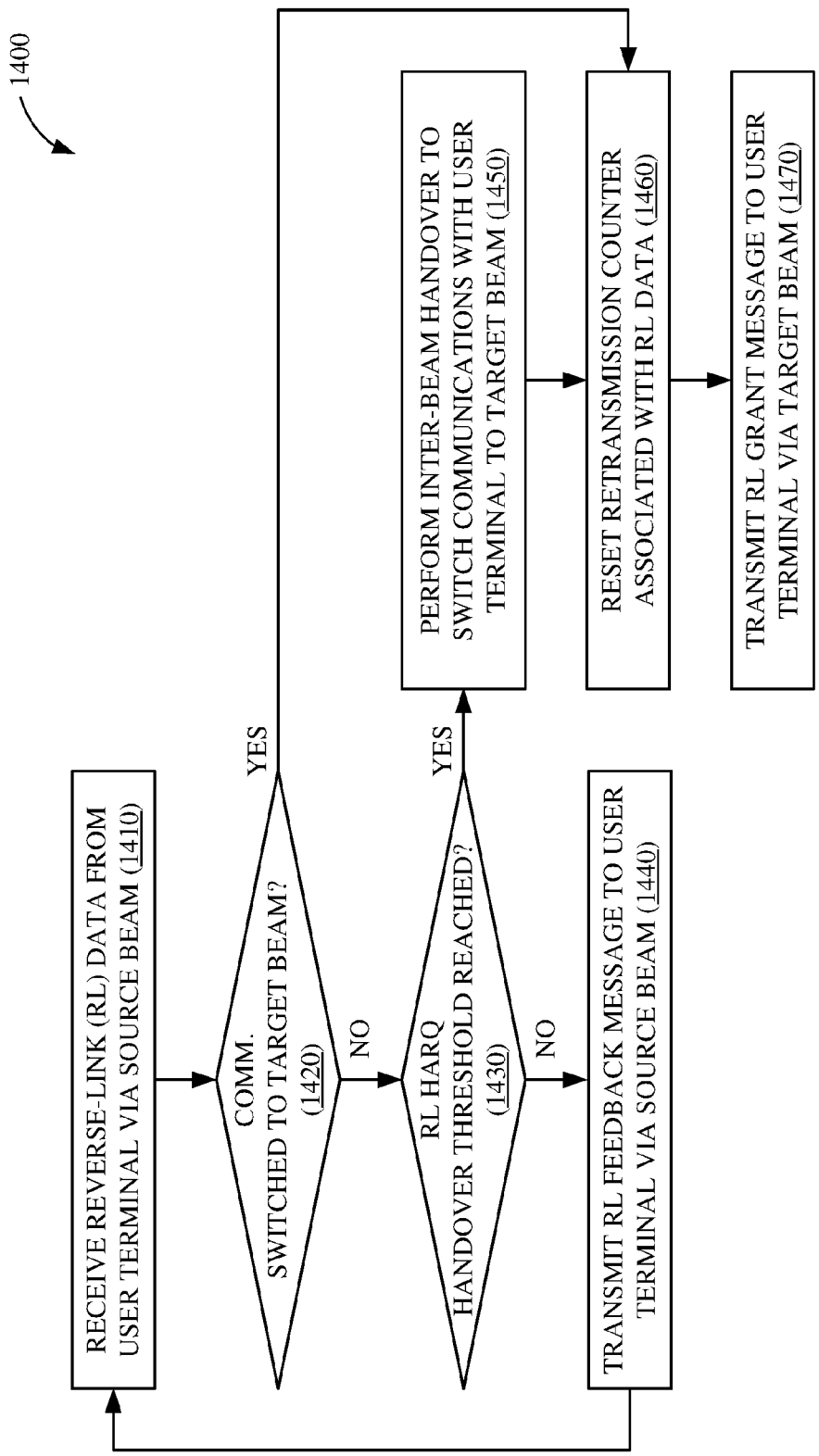
FIG. 14 shows an illustrative flowchart depicting an example operation for transmitting a reverse-link grant message on a target beam in response to data received on a source beam.

The memory 1030 may include a non-transitory computer-readable storage medium (e.g., one or more nonvolatile memory elements, such as EPROM, EEPROM, Flash memory, a hard drive, and so on) that may store the following software (SW) modules:
- a forward-link (FL) HARQ handover module 1036 to transfer ongoing HARQ processes in the forward link from a source beam to a target beam during an inter-beam handover, for example, as described for one or more operations of FIGS. 12-13; and
- a reverse-link (RL) HARQ handover module 1038 to transfer ongoing HARQ processes in the reverse link from a source beam to a target beam during an inter-beam handover, for example, as described for one or more operations of FIG. 14.

Each software module includes instructions that, when executed by processor 1020, cause the network controller 1000 to perform the corresponding functions. The non-transitory computer-readable medium of memory 1030 thus includes instructions for performing all or a portion of the operations of FIG. 12-14.

Processor 1020 may be any suitable one or more processors capable of executing scripts or instructions of one or more software programs stored in the network controller 1000 (e.g., within memory 1030). For example, processor 1020 may execute the FL HARQ handover module 1036 to transfer ongoing HARQ processes in the forward link from a source beam to a target beam during an inter-beam handover, for example, by communicating an FL feedback message received by a scheduler for the source beam (e.g., and related HARQ information) to a scheduler for the target beam. Processor 1020 may execute the RL HARQ handover module 1038 to transfer ongoing HARQ processes in the reverse link from a source beam to a target beam during an inter-beam handover, for example, by communicating a set of RL data received by a scheduler for the source beam (e.g., and related HARQ information) to a scheduler for the target beam. For at least some implementations, the functions performed by executing the FL HARQ handover SW module 1036 and the RL HARQ handover SW module 1038 may correspond to and/or may be performed by the IBH/HARQ logic 152 of FIG. 1.

Figure 11:
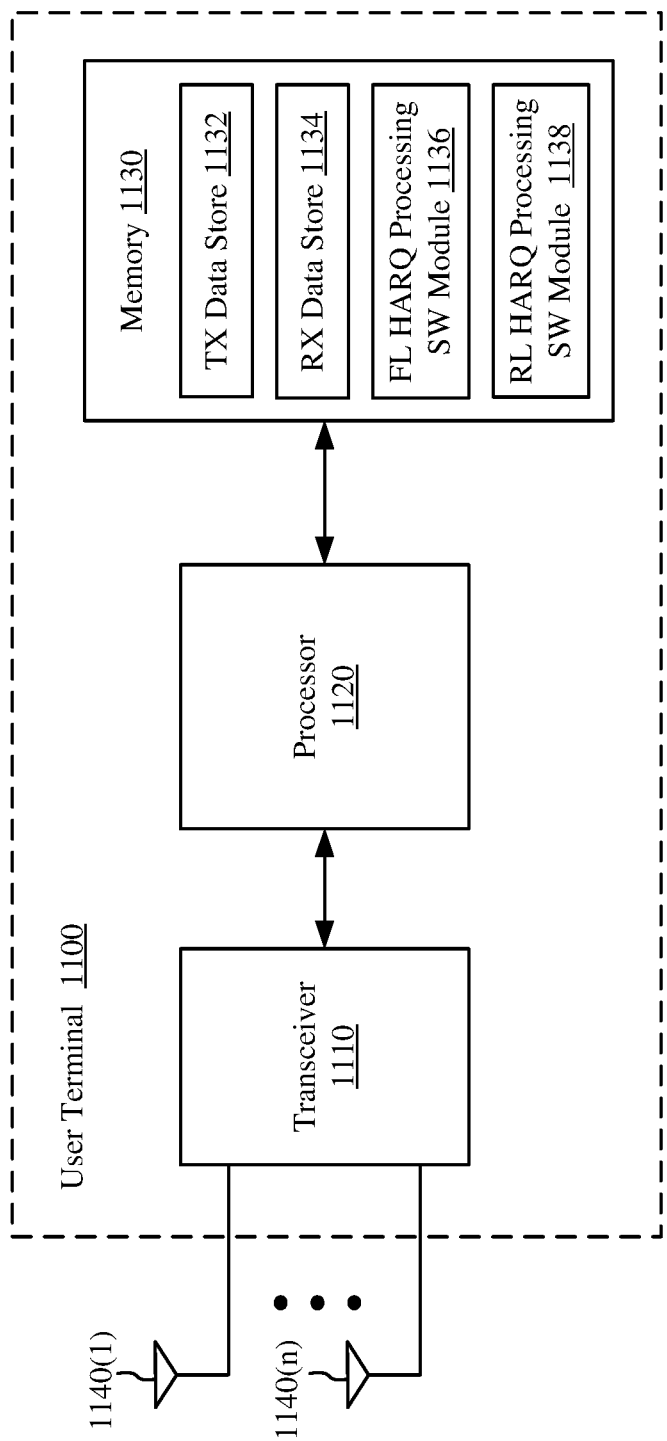
FIG. 11 shows a block diagram of an example UT in accordance with example implementations.

FIG. 11 shows a block diagram of an example user terminal 1100 in accordance with some implementations. The user terminal 1100 may be one implementation of any of the UTs 400 and/or 401 of FIG. 4. The user terminal 1100 includes a transceiver 1110, a processor 1120, a memory 1130, and one or more antennas 1140(1)-1140(n). The transceiver 1110 may be used to transmit signals to and receive signals from satellites, UEs, and/or other suitable wireless devices. In some aspects, the transceiver 1110 may include any number of transceiver chains (not shown for simplicity) that may be coupled to any suitable number of antennas 1140(1)-1140(n). Although not shown in FIG. 11 for simplicity, the user terminal 1100 may include antenna selection logic to selectively couple the transceiver chains of transceiver 1110 to antennas 1140(1)-1140(n).

Memory 1130 includes a transmit (TX) data store 1132 and a receive (RX) data store 1134. The TX data store 1132 may store outgoing data to be transmitted on a forward link of a particular beam of the satellite. In some implementations, the TX data store 1132 may store FL data associated with ongoing HARQ processes maintained by one or more of the schedulers SCH_1-SCH_N for forward-link communications received from a network controller. The RX data store 1134 may store incoming data received on a reverse link of a particular beam of the satellite. In some implementations, the RX data store 1134 may store RL data associated with ongoing HARQ processes maintained by one or more of the schedulers SCH_1-SCH_N for reverse-link communications sent to the network controller.

Figure 15:
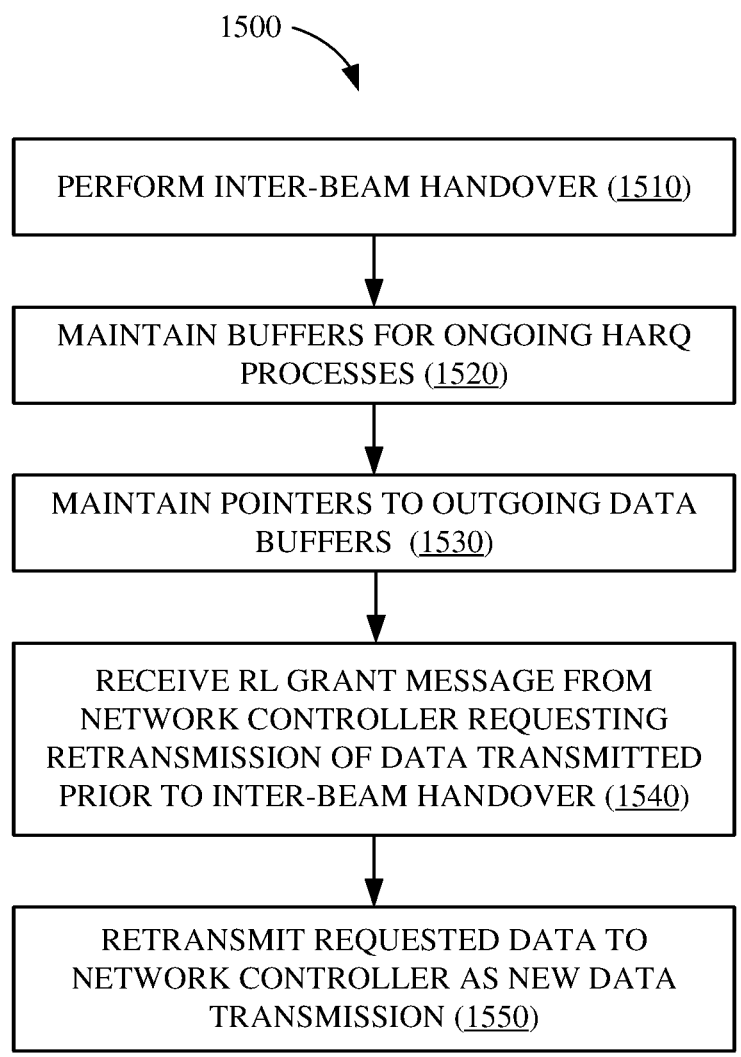
FIG. 15 shows an illustrative flowchart depicting an example operation for preserving HARQ processes on a user terminal during inter-beam handover.

The memory 1130 may also include a non-transitory computer-readable medium (e.g., one or more nonvolatile memory elements, such as EPROM, EEPROM, Flash memory, a hard drive, etc.) that may store at least the following software (SW) modules:
- a forward-link (FL) HARQ processing module 1136 to preserve and/or maintain ongoing HARQ processes in the forward link during an inter-beam handover, for example, as described for one or more operations of FIG. 15; and
- a reverse-link (RL) HARQ processing module 1138 to preserve and/or maintain ongoing HARQ processes in the reverse link during an inter-beam handover, for example, as described for one or more operations of FIG. 15.

Each software module includes instructions that, when executed by processor 1120, cause the user terminal 1100 to perform the corresponding functions. The non-transitory computer-readable medium of memory 1130 thus includes instructions for performing all or a portion of the operations of FIG. 15.

Processor 1120 may be any suitable one or more processors capable of executing scripts or instructions of one or more software programs stored in the user terminal 1100 (e.g., within memory 1130). For example, processor 1120 may execute the FL HARQ processing module 1136 to preserve and/or maintain ongoing HARQ processes in the forward link during an inter-beam handover, for example, by preserving any received FL data associated with the ongoing HARQ processes after switching to the target beam. Processor 1120 may execute the RL HARQ processing module 1138 to preserver and/or maintain ongoing HARQ processes in the reverse link during an inter-beam handover, for example, by maintaining pointers to the buffered RL data associated with the ongoing HARQ processes after switching to the target beam. For at least some implementations, the functions performed by executing the FL HARQ processing SW module 1136 and the RL HARQ processing SW module 1138 may correspond to and/or may be performed by the IBH/HARQ circuit 425 of FIG. 1.

FIG. 12 shows an illustrative flowchart depicting an example operation 1200 for maintaining a HARQ process during inter-beam handover. The example operation 1200 may be performed by the network controller 1000 depicted in FIG. 10. However, it is to be understood that operation 1200 may be performed by other suitable controllers and/or by any suitable components of the NAC 150 of FIG. 1.

First, the network controller 1000 may perform an inter-beam handover to switch communications with a user terminal from a source beam to a target beam of a satellite (1210). For example, with reference to FIG. 7, the user terminal may have crossed the switching threshold 740, at which point the channel quality of beam 710(2) may be superior to the channel quality of beam 710(1) (e.g., as perceived by the user terminal). Thus, it may be desirable to transfer communications between the network controller 1000 and the user terminal from beam 710(1) (e.g., the source beam) to beam 710(2) (e.g., the target beam). In some implementations, the inter-beam handover may be performed in conjunction with the user terminal, for example, according to a timeline specified in a beam transition table.

The network controller 1000 subsequently receives a feedback message from the user terminal, via the source beam, after the inter-beam handover is completed (1220). For example, with reference to FIG. 8A, the user terminal may transmit the feedback message on the source beam prior to initiating the inter-beam handover. However, due to propagation delays, the network controller does not receive the feedback message until after communications with the user terminal have already switched over to the target beam. For example, with reference to FIG. 7, the user terminal may have already crossed the switching threshold 740, but may still be within the overlap region 730 and is therefore still able to receive communications via the source beam (e.g., beam 710(1)).

Thereafter, the network controller 1000 may selectively retransmit data to the user terminal via the target beam based at least in part on the feedback message (1230). In some aspects, the processor 1020 may execute the FL HARQ handover module 1036 to communicate the feedback message, and any related HARQ information needed to preserve the HARQ process that was initiated on the source beam prior to the inter-beam handover, to the scheduler associated with the target beam. For example, the HARQ information may include: the feedback message (e.g., indicating an ACK or a NACK), HARQ process IDs, pointers to buffers storing data associated with any ongoing HARQ processes (e.g., in the TX data store 1032), and/or payload information associated with the pointers. The processor 1020 and/or scheduler for the target beam may then determine whether to retransmit the FL data based on the received feedback message (e.g., whether the feedback message includes an ACK or a NACK).

FIG. 13 shows an illustrative flowchart depicting an example operation 1300 for selectively retransmitting data on a target beam in response to a feedback message received on a source beam. The example operation 1300 may be performed by the network controller 1000 depicted in FIG. 10. However, it is to be understood that operation 1300 may be performed by other suitable controllers and/or by any suitable components of the NAC 150 of FIG. 1.

First, the network controller 1000 may transmit forward-link (FL) data to a user terminal via a source beam of a satellite (1310). The network controller 1000 may then determine whether an FL HARQ handover threshold has been reached (1320). For example, with reference to FIG. 8A, due to processing times needed by the user terminal to process the FL data and/or other delays, any forward link communication initiated beyond the FL HARQ handover threshold is unlikely to be processed by the user terminal before the inter-beam handover. As long as the FL HARQ handover threshold has not yet been reached (as tested at 1320), the network controller 1000 may continue to transmit FL data to the user terminal via the source beam (1310).

However, once the FL HARQ handover threshold is reached (as tested at 1320), the network controller 1000 may suspend FL transmissions to the user terminal on the source beam (1330). For example, if the network controller 1000 were to transmit FL data on the source beam past the FL HARQ handover threshold, the user terminal may be unable to return an FL feedback message for the received FL data because it may no longer be operating on the source beam. In some aspects, the FL HARQ handover threshold may be suspended until the network controller 1000 performs an inter-beam handover to switch communications with the user terminal to a target beam of the satellite (1340). In some implementations, the inter-beam handover may be performed in conjunction with the user terminal, for example, based on a timeline specified in a beam transition table.

After the inter-beam handover is completed, the network controller 1000 may resume FL communications with the user terminal on the target beam (1350), but may still receive FL feedback messages from the user terminal via the source beam (1360). Upon receiving the FL feedback message on the source beam, the network controller 1000 may determine whether a retransmission is needed (1370). For example, as long as the feedback message does not include a NACK of previously transmitted FL data (as tested at 1370), the network controller 1000 may simply resume FL communications with the user terminal on the target beam (1350).

However, if the feedback message includes a NACK of previously transmitted FL data (as tested at 1370), the network controller 1000 may subsequently retransmit the FL data via the target beam (1380). For example, in some aspects, the processor 1020 may execute the FL HARQ handover module 1036 to communicate the feedback message, and any related HARQ information needed to preserve the HARQ process that was initiated on the source beam prior to the inter-beam handover, to the scheduler associated with the target beam. The processor 1020 and/or scheduler associated with the target beam may then identify and retrieve the FL data that needs to be retransmitted to the user terminal (e.g., as indicated by the FL feedback message), and subsequently retransmit the FL data on the target beam.

FIG. 14 shows an illustrative flowchart depicting an example operation 1400 for transmitting a reverse-link grant message on a target beam in response to data received on a source beam. The example operation 1400 may be performed by the network controller 1000 depicted in FIG. 10. However, it is to be understood that operation 1400 may be performed by other suitable controllers and/or by any suitable components of the NAC 150 of FIG. 1.

First, the network controller 1000 receives reverse-link (RL) data from the user terminal via a source beam of a satellite (1410). The network controller 1000 may then determine whether communications with the user terminal have already switched to a target beam of the satellite (1420). For example, with reference to FIG. 9A, due to propagation delays, the network controller 1000 may receive the RL data via the source beam after performing an inter-beam handover by which communications with the user terminal are handed over to the target beam. As a result, the network controller 1000 may be unable to respond to the received RL data via the source beam.

If communications with the user terminal have not yet switched over to the target beam (as tested at 1420), the network controller 1000 may then determine whether an RL HARQ handover threshold has been reached (1430). For example, with reference to FIG. 9A, due to the processing time needed to process the received RL data and/or other delays, any reverse link communication received beyond the RL HARQ handover threshold is unlikely to be processed by the network controller 1000 before the inter-beam handover. As long as the RL HARQ handover threshold has not yet been reached (as tested at 1430), the network controller 1000 may transmit an RL feedback message to the user terminal via the source beam (1440). For example, the RL feedback message may indicate whether the RL data was received correctly (e.g., ACK) or with errors (e.g., NACK).

However, once the RL HARQ handover threshold is reached (as tested at 1430), the network controller 1000 may temporarily refrain from transmitting the RL feedback message to the user terminal until it performs an inter-beam handover to switch communications with the user terminal to the target beam (1450). In some aspects, the network controller 1000 may subsequently reset a retransmission counter for the HARQ process associated with the received RL data (1460). As described above, with respect to FIG. 9A, it may be difficult to combine portions of previously received RL data (e.g., received via the source beam prior to the inter-beam handover) with subsequently received RL data (e.g., received via the target beam after the inter-beam handover). Thus, in order to prevent any retransmissions attempted on the source beam from reducing the number of subsequent retransmissions that may be allowed on the target beam, the processor 1020 may execute the RL HARQ handover module 1038 to reset the retransmission counter associated with the corresponding HARQ process.

The network controller 1000 may then transmit an RL grant message (and/or RL feedback message) to the user terminal via the target beam (1470). For example, the processor 1020, in executing the RL HARQ handover module 1038, may communicate the received RL data, and any related HARQ information needed to preserve the HARQ process that was initiated on the source beam prior to the inter-beam handover, to the scheduler associated with the target beam. The processor 1020 and/or scheduler associated with the target beam may then transmit an RL grant message to enable the user terminal to begin transmitting reverse-link communications to the network controller 1000 via the target beam. In some aspects, the RL grant message may include a retransmission request for RL data received with errors (e.g., prior to the inter-beam handover). For example, the processor 1020, in executing the RL HARQ handover module 1038, may request that any data to be retransmitted for an ongoing HARQ process is sent as a new data transmission (e.g., rather than a retransmission attempt for the particular HARQ process).

Still further, if the network controller 1000 receives RL data from the user terminal via the source beam (1410) after communications with the user terminal have already switched over to the target beam (as tested at 1420), the network controller 1000 may simply proceed by resetting the retransmission counter for the HARQ process associated with the received RL data (1460) and transmit the RL grant message to the user terminal via the target beam (1470). More specifically, the processor 1020, in executing the RL HARQ handover module 1038, may bypass the inter-beam handover (e.g., at 1450) since the network controller 1000 has already switched communications with the user terminal over to the target beam.

FIG. 15 shows an illustrative flowchart depicting an example operation 1500 for preserving HARQ processes on a user terminal during inter-beam handover. The example operation 1500 may be performed by the user terminal 1100 depicted in FIG. 11. However, it is to be understood that operation 1500 may be performed by other suitable devices capable of receiving forward-link communications from the satellite 300 of FIG. 1.

First, the user terminal 1100 performs an inter-beam handover to switch communications with a network controller from a source beam to a target beam of a satellite (1510). The inter-beam handover may be performed in conjunction with the network controller (e.g., network controller 1000 of FIG. 1), for example, according to a timeline specified in a beam transition table.

The user terminal 1100 may maintain buffers for ongoing HARQ processes (1520) after the inter-beam handover is completed. For example, to maintain ongoing HARQ processes on the forward link during the inter-beam handover, the processor 1120 may execute the FL HARQ processing module 1136 to preserve the data stored in any HARQ buffers (e.g., FL data containing errors) for HARQ processes initiated prior to the inter-beam handover.

Additionally, the user terminal 1100 may maintain pointers to outgoing data buffers (1530) after the inter-beam handover is completed. For example, to maintain ongoing HARQ processes on the reverse link during the inter-beam handover, the processor 1120 may execute the RL HARQ processing module 1138 to preserve the pointers to any outgoing data (e.g., associated with an ongoing HARQ process) that may need to be retransmitted after the inter-beam handover is completed.

The user terminal 1100 may further receive an RL grant message (and/or RL feedback message) from a network controller requesting retransmission of data transmitted prior to the inter-beam handover (1540). For example, with reference to FIGS. 9A and 9B, the network controller may transmit the RL grant message on the target beam (e.g., after the inter-beam handover) based at least in part on RL data received on the source beam (e.g., prior to the inter-beam handover).

Finally, the user terminal may retransmit the requested data to the network controller as a new data transmission (1550). As described above, with respect to FIG. 9A, it may be difficult for the network controller to combine portions of previously received RL data (e.g., received via the source beam prior to the inter-beam handover) with newly received RL data (e.g. received via the target beam after the inter-beam handover). Thus, in order to prevent any retransmissions attempted on the source beam from reducing the number of subsequent retransmissions that may be allowed on the target beam, the processor 1120, in executing the RL HARQ processing module 1138, may retransmit the RL data to the network controller as a new data transmission. In some aspects, the RL grant message may include a request for the RL data to be sent as a new data transmission.

Figure 16:
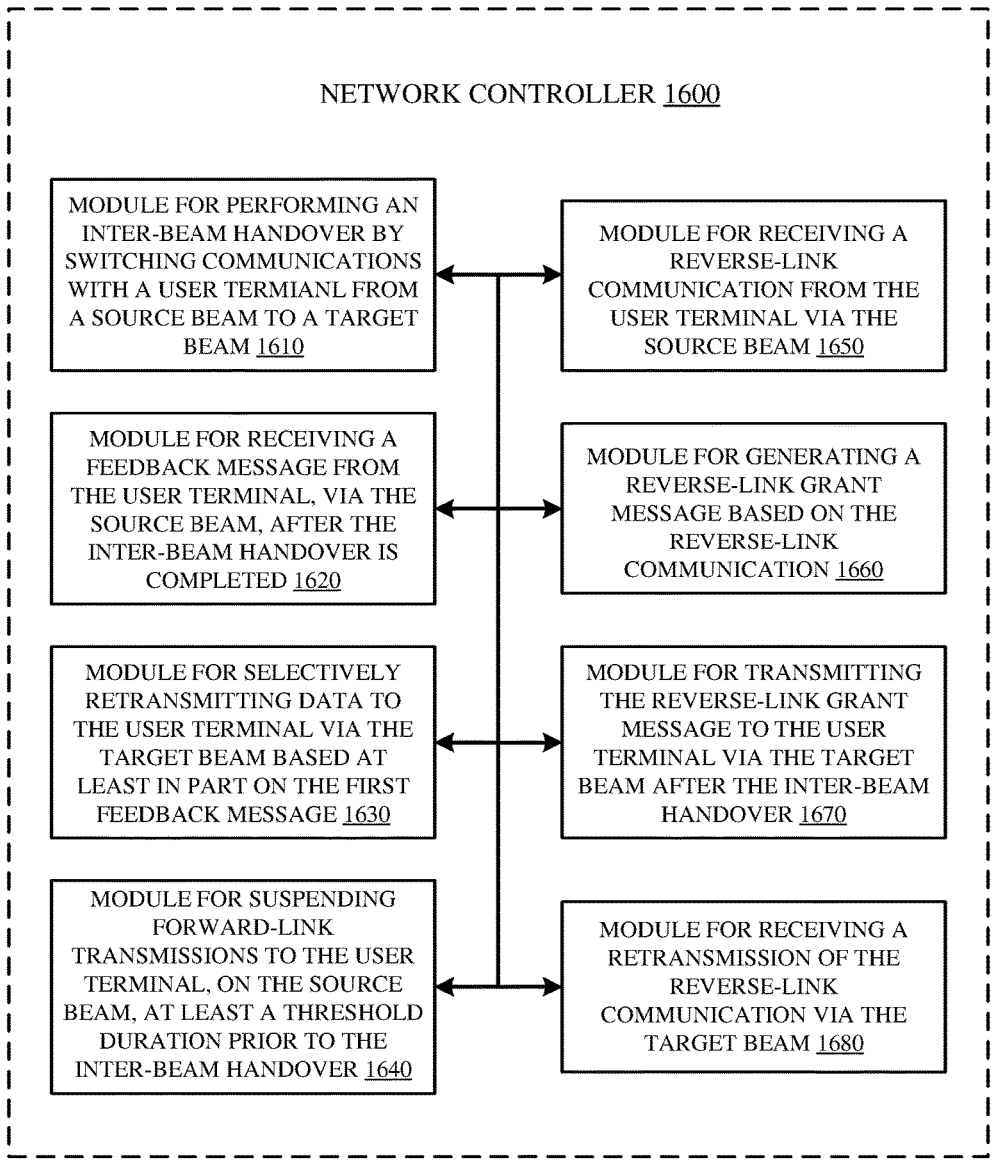
FIG. 16 shows an example network controller represented as a series of interrelated functional modules.

FIG. 16 shows an example network controller 1600 represented as a series of interrelated functional modules. A module 1610 for performing an inter-beam handover by switching communications with a user terminal from a source beam to a target beam of a satellite may correspond at least in some aspects to, for example, a processor as discussed herein (e.g., processor 1020) and/to a scheduler as discussed herein (e.g., one of schedulers SCH_1-SCH_N). A module 1620 for receiving a feedback message from the user terminal, via the source beam, after the inter-beam handover is completed may correspond at least in some aspects to, for example, a processor as discussed herein (e.g., processor 1020) and/to a scheduler as discussed herein (e.g., one of schedulers SCH_1-SCH_N). A module 1630 for selectively retransmitting data to the user terminal via the target beam based at least in part on the feedback message may correspond at least in some aspects to, for example, a processor as discussed herein (e.g., processor 1020) and/to a scheduler as discussed herein (e.g., one of schedulers SCH_1-SCH_N). A module 1640 for suspending forward-link transmissions to the user terminal, on the source beam, at least a threshold duration prior to the inter-beam handover may correspond at least in some aspects to, for example, a processor as discussed herein (e.g., processor 1020).

A module 1650 for receiving a reverse-link communication from the user terminal via the source beam may correspond at least in some aspects to, for example, a processor as discussed herein (e.g., processor 1020) and/to a scheduler as discussed herein (e.g., one of schedulers SCH_1-SCH_N). A module 1660 for generating a reverse-link grant message based on the reverse-link communication may correspond at least in some aspects to, for example, a processor as discussed herein (e.g., processor 1020) and/to a scheduler as discussed herein (e.g., one of schedulers SCH_1-SCH_N). A module 1670 for transmitting the reverse-link grant message to the user terminal via the target beam after the inter-beam handover may correspond at least in some aspects to, for example, a processor as discussed herein (e.g., processor 1020) and/to a scheduler as discussed herein (e.g., one of schedulers SCH_1-SCH_N). A module 1680 for receiving a retransmission of the reverse-link communication via the target beam may correspond at least in some aspects to, for example, a processor as discussed herein (e.g., processor 1020) and/to a scheduler as discussed herein (e.g., one of schedulers SCH_1-SCH_N).

Figure 17:
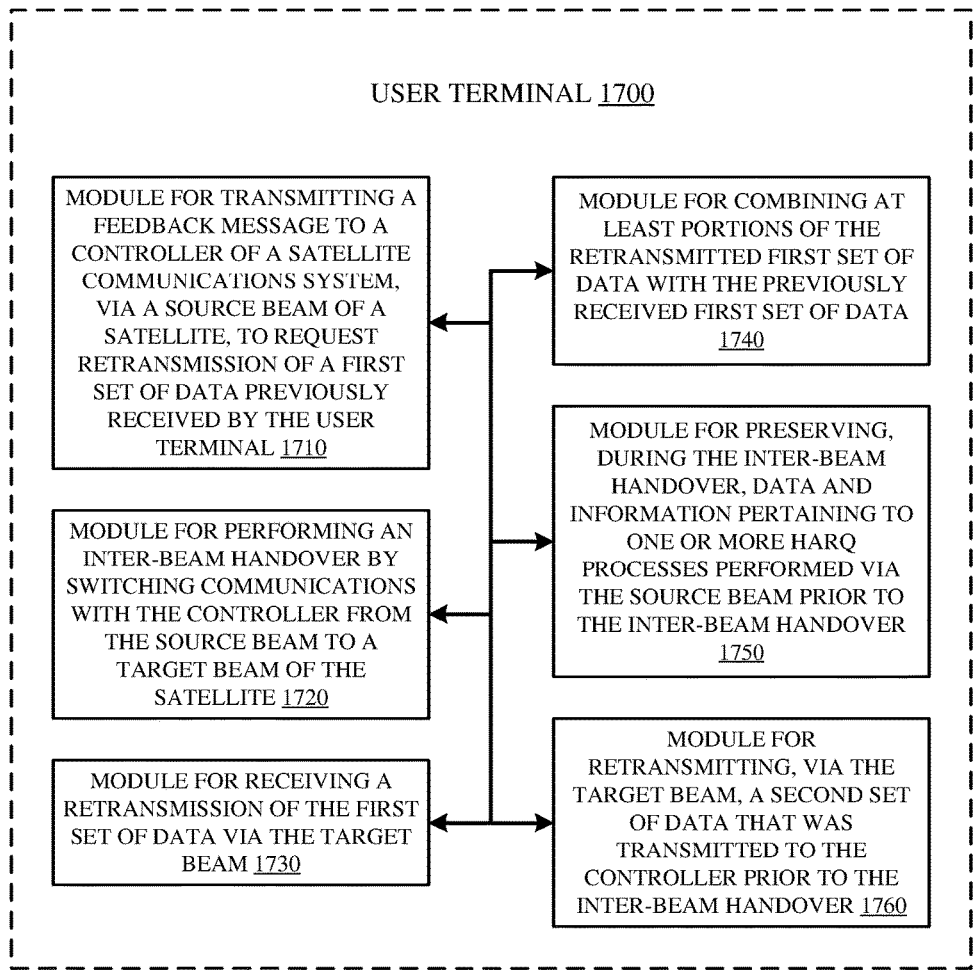
FIG. 17 shows an example user terminal represented as a series of interrelated functional modules.

FIG. 17 shows an example user terminal 1700 represented as a series of interrelated functional modules. A module 1710 for transmitting a feedback message to a controller of a satellite communications system, via a source beam of a satellite, to request retransmission of a first set of data previously received by the user terminal 1700 may correspond at least in some aspects to, for example, a processor as discussed herein (e.g., processor 1120) and/to a transceiver as discussed herein (e.g., transceiver 1110). A module 1720 for performing an inter-beam handover by switching communications with the controller from the source beam to a target beam of the satellite may correspond at least in some aspects to, for example, a processor as discussed herein (e.g., processor 1120) and/to a transceiver as discussed herein (e.g., transceiver 1110). A module 1730 for receiving a retransmission of the first set of data via the target beam may correspond at least in some aspects to, for example, a processor as discussed herein (e.g., processor 1120) and/to a transceiver as discussed herein (e.g., transceiver 1110).

A module 1740 for combining at least portions of the retransmitted first set of data with the previously received first set of data may correspond at least in some aspects to, for example, a processor as discussed herein (e.g., processor 1120). A module 1750 for preserving, during the inter-beam handover, data and information pertaining to one or more hybrid automatic repeat request (HARQ) processes performed via the source beam prior to the inter-beam handover may correspond at least in some aspects to, for example, a processor as discussed herein (e.g., processor 1120). A module 1760 for retransmitting, via the target beam, a second set of data that was transmitted to the controller prior to the inter-beam handover may correspond at least in some aspects to, for example, a processor as discussed herein (e.g., processor 1120) and/to a transceiver as discussed herein (e.g., transceiver 1110).

The functionality of the modules of FIGS. 16 and 17 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 16 and 17, as well as other components and functions described herein, may be implemented using any suitable means. Such means also may be implemented, at least in part, using corresponding structure as taught herein. For example, the components described above in conjunction with the "module for" components of FIGS. 16 and 17 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of operating a controller for a satellite communications system, the method comprising:
performing an inter-beam handover by switching communications with a user terminal from a first beam to a second beam of a satellite;
receiving a feedback message from the user terminal, via the first beam, after the inter-beam handover is completed; and
selectively retransmitting data to the user terminal via the second beam based at least in part on the feedback message received on the first beam after the inter-beam handover.

2. The method of claim 1, wherein the feedback message includes a negative acknowledgement (NACK) of a forward-link communication sent to the user terminal, via the first beam, prior to the inter-beam handover.

3. The method of claim 2, wherein the selectively retransmitting comprises:
retransmitting, via the second beam, at least a portion of the forward-link communication associated with the feedback message.

4. The method of claim 1, further comprising:
suspending forward-link transmissions to the user terminal on the first beam at least a threshold duration prior to the inter-beam handover.

5. The method of claim 4, wherein the threshold duration includes at least a processing time for the user terminal to process a forward-link communication.

6. The method of claim 1, further comprising:
receiving a reverse-link communication from the user terminal via the first beam;
generating a reverse-link grant message based on the reverse-link communication; and
transmitting the reverse-link grant message to the user terminal via the second beam after the inter-beam handover is completed.

7. The method of claim 6, wherein the reverse-link grant message includes a retransmission request for the reverse-link communication.

8. The method of claim 7, further comprising:
receiving a retransmission of the reverse-link communication via the second beam in response to the reverse-link grant message.

9. The method of claim 8, wherein the retransmitted communication is received as a new transmission.

10. The method of claim 1, further comprising:
making available to a scheduler for the second beam, upon completing the inter-beam handover, data or information pertaining to one or more ongoing hybrid automatic repeat request (HARQ) processes from the first beam to enable data combining.

11. A controller for a satellite communications system, the controller comprising:
one or more processors; and
a memory configured to store instructions that, when executed by the one or more processors, cause the controller to:
perform an inter-beam handover by switching communications with a user terminal from a first beam to a second beam of a satellite;
receive a feedback message from the user terminal, via the first beam, after the inter-beam handover is completed; and
selectively retransmit data to the user terminal via the second beam based at least in part on the feedback message received on the first beam after the inter-beam handover.

12. The controller of claim 11, wherein the feedback message includes a negative acknowledgement (NACK) of a forward-link communication sent to the user terminal, via the first beam, prior to the inter-beam handover.

13. The controller of claim 12, wherein execution of the instructions to selectively retransmit the data to the user terminal causes the controller to:
retransmit, via the second beam, at least a portion of the forward-link communication associated with the feedback message.

14. The controller of claim 11, wherein execution of the instructions by the one or more processors further causes the controller to:
suspend forward-link transmissions to the user terminal on the first beam at least a threshold duration prior to the inter-beam handover.

15. The controller of claim 11, wherein execution of the instructions by the one or more processors further causes the controller to:
receive a reverse-link communication from the user terminal via the first beam;
generate a reverse-link grant message based on the reverse-link communication; and
transmit the reverse-link grant message to the user terminal via the second beam after the inter-beam handover is completed.

16. The controller of claim 15, wherein the reverse-link grant message includes a retransmission request for the reverse-link communication.

17. The controller of claim 16, wherein execution of the instructions by the one or more processors further causes the controller to:
receive a retransmission of the reverse-link communication via the second beam in response to the reverse-link grant message, wherein the retransmitted communication is received as a new transmission.

18. The controller of claim 11, wherein execution of the instructions further causes the controller to:
make available to a scheduler for the second beam, upon completing the inter-beam handover, data or information pertaining to one or more ongoing hybrid automatic repeat request (HARQ) processes from the first beam to enable data combining.

19. A controller for a satellite communications system, the controller comprising:
means for performing an inter-beam handover by switching communications with a user terminal from a first beam to a second beam of a satellite;
means for receiving a feedback message from the user terminal, via the first beam, after the inter-beam handover is completed; and
means for selectively retransmitting data to the user terminal via the second beam based at least in part on the feedback message received on the first beam after the inter-beam handover.

20. The controller of claim 19, wherein the feedback message includes a negative acknowledgement (NACK) of a forward-link communication sent to the user terminal, via the first beam, prior to the inter-beam handover.

21. The controller of claim 20, wherein the means for selectively retransmitting data to the user terminal is to:
retransmit, via the second beam, at least a portion of the forward-link communication associated with the feedback message.

22. The controller of claim 19, further comprising:
means for suspending forward-link transmissions to the user terminal on the first beam at least a threshold duration prior to the inter-beam handover, wherein the threshold duration includes at least a processing time for the user terminal to process a forward-link communication.

23. The controller of claim 19, further comprising:
means for receiving a reverse-link communication from the user terminal via the first beam;
means for generating a reverse-link grant message based on the reverse-link communication; and
means for transmitting the reverse-link grant message to the user terminal via the second beam after the inter-beam handover is completed.

24. The controller of claim 23, wherein the reverse-link grant message includes a retransmission request for the reverse-link communication.

25. The controller of claim 24, further comprising:
means for receiving a retransmission of the reverse-link communication via the second beam in response to the reverse-link grant message, wherein the retransmitted communication is received as a new transmission.

26. The controller of claim 19, further comprising:
means for making available to a scheduler for the second beam, upon completing the inter-beam handover, data or information pertaining to one or more ongoing hybrid automatic repeat request (HARQ) processes from the first beam to enable data combining.

27. A non-transitory computer-readable medium storing instructions that, when executed by one or more processors of a controller for a satellite communications system, cause the controller to perform operations comprising:
performing an inter-beam handover by switching communications with a user terminal from a first beam to a second beam of a satellite;
receiving a feedback message from the user terminal, via the first beam, after the inter-beam handover is completed; and
selectively retransmitting data to the user terminal via the second beam based at least in part on the feedback message received on the first beam after the inter-beam handover.

28. The non-transitory computer-readable medium of claim 27, wherein the feedback message includes a negative acknowledgement (NACK) of a forward-link communication sent to the user terminal, via the first beam, prior to the inter-beam handover, and wherein execution of the instructions for selectively retransmitting the data to the user terminal causes the controller to perform operations comprising:
retransmitting, via the second beam, at least a portion of the forward-link communication associated with the feedback message.

29. The non-transitory computer-readable medium of claim 27, wherein execution of the instructions by the one or more processors causes the controller to perform operations further comprising:
suspending forward-link transmissions to the user terminal on the first beam at least a threshold duration prior to the inter-beam handover, wherein the threshold duration includes at least a processing time for the user terminal to process a forward-link communication.

30. The non-transitory computer-readable medium of claim 27, wherein execution of the instructions by the one or more processors causes the controller to perform operations further comprising:
receiving a reverse-link communication from the user terminal via the first beam;
generating a reverse-link grant message based on the reverse-link communication; and
transmitting the reverse-link grant message to the user terminal via the second beam after the inter-beam handover is completed.

31. The non-transitory computer-readable medium of claim 30, wherein the reverse-link grant message includes a retransmission request for the reverse-link communication, and wherein execution of the instructions by the one or more processors causes the controller to perform operations further comprising:
receiving a retransmission of the reverse-link communication via the second beam in response to the reverse-link grant message, wherein the retransmitted communication is received as a new transmission.

32. The non-transitory computer-readable medium of claim 27, wherein execution of the instructions further causes the controller to perform operations comprising:
  making available to a scheduler for the second beam, upon completing the inter-beam handover, data or information pertaining to one or more ongoing hybrid automatic repeat request (HARQ) processes from the first beam to enable data combining.

33. A method of operating a user terminal in a satellite communications system, the method comprising:
  transmitting a feedback message to a controller of the satellite communications system, via a first beam of a satellite, to request retransmission of a first set of data previously received by the user terminal;
  performing an inter-beam handover by switching communications with the controller from the first beam to a second beam of the satellite; and
  receiving a retransmission of the first set of data via the second beam based at least in part on the feedback message transmitted on the first beam prior to the inter-beam handover.

34. The method of claim 33, further comprising:
  combining at least portions of the retransmitted first set of data with the previously received first set of data.

35. The method of claim 33, further comprising:
  preserving, during the inter-beam handover, data and information pertaining to one or more hybrid automatic repeat request (HARQ) processes performed via the first beam prior to the inter-beam handover.

36. The method of claim 33, further comprising:
  receiving a reverse-link grant message from the controller, via the second beam, after the inter-beam handover is completed;
  identifying a retransmission request in the reverse-link grant message for a second set of data sent to the controller prior to the inter-beam handover; and
  retransmitting the second set of data to the controller in response to the retransmission request.

37. The method of claim 36, wherein the retransmitted second set of data is sent as a new data transmission.

38. A user terminal, comprising:
  one or more processors; and
  a memory configured to store instructions that, when executed by the one or more processors, cause the user terminal to:
    transmit a feedback message to a controller of a satellite communications system, via a first beam of a satellite, to request retransmission of a first set of data previously received by the user terminal;
    perform an inter-beam handover by switching communications with the controller from the first beam to a second beam of the satellite; and
    receive a retransmission of the first set of data via the second beam based at least in part on the feedback message transmitted on the first beam prior to the inter-beam handover.

39. The user terminal of claim 38, wherein execution of the instructions by the one or more processors further causes the user terminal to:
  combine at least portions of the retransmitted first set of data with the previously received first set of data.

40. The user terminal of claim 38, wherein execution of the instructions by the one or more processors further causes the user terminal to:
  preserve, during the inter-beam handover, data and information pertaining to one or more hybrid automatic repeat request (HARQ) processes performed via the first beam prior to the inter-beam handover.

41. The user terminal of claim 38, wherein execution of the instructions by the one or more processors further causes the user terminal to:
  receive a reverse-link grant message from the controller, via the second beam, after the inter-beam handover is completed;
  identify a retransmission request in the reverse-link grant message for a second set of data sent to the controller prior to the inter-beam handover; and
  retransmit the second set of data to the controller in response to the retransmission request.

42. The user terminal of claim 41, wherein the retransmitted second set of data is sent as a new data transmission.

43. A user terminal, comprising:
  means for transmitting a feedback message to a controller of a satellite communications system, via a first beam of a satellite, to request retransmission of a first set of data previously received by the user terminal;
  means for performing an inter-beam handover by switching communications with the controller from the first beam to a second beam of the satellite; and
  means for receiving a retransmission of the first set of data via the second beam based at least in part on the feedback message transmitted on the first beam prior to the inter-beam handover.

44. The user terminal of claim 43, further comprising:
  means for combining at least portions of the retransmitted first set of data with the previously received first set of data.

45. The user terminal of claim 43, further comprising:
  means for preserving, during the inter-beam handover, data and information pertaining to one or more hybrid automatic repeat request (HARQ) processes performed via the first beam prior to the inter-beam handover.

46. The user terminal of claim 43, further comprising:
  means for receiving a reverse-link grant message from the controller, via the second beam, after the inter-beam handover is completed;
  means for identifying a retransmission request in the reverse-link grant message for a second set of data sent to the controller prior to the inter-beam handover; and
  means for retransmitting the second set of data to the controller in response to the retransmission request, wherein the retransmitted second set of data is sent as a new data transmission.

47. A non-transitory computer-readable medium storing instructions that, when executed by one or more processors of a user terminal, cause the user terminal to perform operations comprising:
  transmitting a feedback message to a controller of a satellite communications system, via a first beam of a satellite, to request retransmission of a first set of data previously received by the user terminal;
  performing an inter-beam handover by switching communications with the controller from the first beam to a second beam of the satellite; and
  receiving a retransmission of the first set of data via the second beam based at least in part on the feedback message transmitted on the first beam prior to the inter-beam handover.

48. The non-transitory computer-readable medium of claim 47, wherein execution of the instructions by the one or more processors causes the user terminal to perform operations further comprising:

combining at least portions of the retransmitted first set of data with the previously received first set of data.

49. The non-transitory computer-readable medium of claim 47, wherein execution of the instructions by the one or more processors causes the user terminal to perform operations further comprising:
preserving, during the inter-beam handover, data and information pertaining to one or more hybrid automatic repeat request (HARQ) processes performed via the first beam prior to the inter-beam handover.

50. The non-transitory computer-readable medium of claim 48, wherein execution of the instructions by the one or more processors causes the user terminal to perform operations further comprising:
receiving a reverse-link grant message from the controller, via the second beam, after the inter-beam handover is completed;
identifying a retransmission request in the reverse-link grant message for a second set of data sent to the controller prior to the inter-beam handover; and
retransmitting the second set of data to the controller in response to the retransmission request, wherein the retransmitted second set of data is sent as a new data transmission.

* * * * *